(12) United States Patent
Zhou et al.

(10) Patent No.: US 9,776,715 B2
(45) Date of Patent: *Oct. 3, 2017

(54) AMPHIBIOUS VERTICAL TAKEOFF AND LANDING UNMANNED DEVICE

(71) Applicants: Andrew H B Zhou, Tiburon, CA (US); Dylan T X Zhou, Belvedere Tiburon, CA (US); Tiger T G Zhou, Tiburon, CA (US)

(72) Inventors: Andrew H B Zhou, Tiburon, CA (US); Dylan T X Zhou, Belvedere Tiburon, CA (US); Tiger T G Zhou, Tiburon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/350,458

(22) Filed: Nov. 14, 2016

(65) Prior Publication Data
US 2017/0072755 A1 Mar. 16, 2017

Related U.S. Application Data

(63) Continuation-in-part of application No. 29/572,722, filed on Jul. 29, 2016, and a continuation-in-part of
(Continued)

(51) Int. Cl.
*B64C 35/00* (2006.01)
*B60F 5/02* (2006.01)
(Continued)

(52) U.S. Cl.
CPC .............. *B64C 35/008* (2013.01); *B60F 5/02* (2013.01); *B60K 16/00* (2013.01); *B60R 11/04* (2013.01);
(Continued)

(58) Field of Classification Search
CPC ... B64C 29/0033; B64C 35/00; B64C 35/008; B64C 2201/088; B60F 3/0061; B60F 5/02
See application file for complete search history.

(56) References Cited

U.S. PATENT DOCUMENTS 2,989,269 A * 6/1961 Le Bel ................ B64C 29/0033
114/289
3,029,042 A * 4/1962 Martin ...................... B60F 3/00
180/119

(Continued)

*Primary Examiner* — Joseph W Sanderson
(74) *Attorney, Agent, or Firm* — Georgiy L. Khayet

(57) ABSTRACT

An amphibious vertical takeoff and landing (VTOL) unmanned device is provided. The amphibious VTOL unmanned device includes a modular and expandable waterproof body, an outer body shell, a gimbaled swivel propulsion system comprising a plurality of VTOL jet engines and VTOL ducted fans, a processor, electronic speed controllers, a two-way telemetry device, a video transmitter, a radio control receiver, a power distribution board, an electrical machine, an onboard electricity generator comprising a plurality of solar cells, a light detection and ranging device, an ultrasonic radar sensor, a plurality of sensors, a tail configured to stabilize the amphibious VTOL unmanned device, a head VTOL ducted fan adapted for VTOL, a plurality of wheels, a plurality of foldable wings configured to create a pressure difference and creating a lift, a plurality of parachutes configured to safely land the amphibious VTOL unmanned device in an emergency.

29 Claims, 50 Drawing Sheets

Related U.S. Application Data application No. 29/567,712, filed on Jun. 10, 2016, and a continuation-in-part of application No. 14/940,379, filed on Nov. 13, 2015, now Pat. No. 9,493,235, and a continuation-in-part of application No. 15/345,349, filed on Nov. 7, 2016, which is a continuation-in-part of application No. 14/957,644, filed on Dec. 3, 2015, now Pat. No. 9,489,671, which is a continuation-in-part of application No. 14/815,988, filed on Aug. 1, 2015, now Pat. No. 9,342,829, and a continuation-in-part of application No. 13/760,214, filed on Feb. 6, 2013, now Pat. No. 9,016,565, which is a continuation-in-part of application No. 10/677,098, filed on Sep. 30, 2003, now Pat. No. 7,702,739.

(60) Provisional application No. 60/415,546, filed on Oct. 1, 2002.

(51) Int. Cl.

| | |
|---|---|
| *B64C 29/00* | (2006.01) |
| *B64C 39/02* | (2006.01) |
| *G05D 1/04* | (2006.01) |
| *B64C 37/00* | (2006.01) |
| *G05D 1/08* | (2006.01) |
| *G08G 5/04* | (2006.01) |
| *B60R 11/04* | (2006.01) |
| *B60K 16/00* | (2006.01) |

(52) U.S. Cl.
CPC .......... *B64C 29/0033* (2013.01); *B64C 37/00* (2013.01); *B64C 39/024* (2013.01); *G05D 1/0816* (2013.01); *G05D 1/0858* (2013.01); *G08G 5/04* (2013.01); *B60K 2016/003* (2013.01); *B64C 2201/021* (2013.01); *B64C 2201/102* (2013.01); *B64C 2201/141* (2013.01); *B64C 2201/162* (2013.01)

(56) References Cited

U.S. PATENT DOCUMENTS

| | | | | |
|---|---|---|---|---|
| 4,579,297 | A * | 4/1986 | Ayoola | B60F 3/00 244/106 |
| 5,645,250 | A * | 7/1997 | Gevers | B64C 1/00 244/101 |
| 6,138,943 | A * | 10/2000 | Huang | B60F 5/02 244/17.25 |
| 7,472,863 | B2 * | 1/2009 | Pak | A63H 27/14 244/12.5 |
| 7,874,513 | B1 * | 1/2011 | Smith | B64C 11/001 244/12.4 |
| 7,959,104 | B2 * | 6/2011 | Kuntz | A63H 17/00 244/2 |
| 8,827,200 | B2 * | 9/2014 | Radu | B60F 5/02 244/2 |
| 9,045,226 | B2 * | 6/2015 | Piasecki | G05D 1/102 |
| 9,085,355 | B2 * | 7/2015 | DeLorean | B64C 29/0033 |
| 9,493,235 | B2 * | 11/2016 | Zhou | B60F 5/02 |
| 2002/0125367 | A1 * | 9/2002 | Killingsworth | B60F 3/00 244/17.11 |
| 2002/0195518 | A1 * | 12/2002 | Killingsworth | B60F 3/00 244/7 A |
| 2005/0236520 | A1 * | 10/2005 | Wukowitz | B64C 5/02 244/105 |
| 2006/0016930 | A1 * | 1/2006 | Pak | A63H 27/14 244/12.4 |
| 2008/0048065 | A1 * | 2/2008 | Kuntz | A63H 17/00 244/17.23 |
| 2010/0181414 | A1 * | 7/2010 | Lopez, Jr. | B64C 29/0033 244/12.4 |
| 2011/0042507 | A1 * | 2/2011 | Seiford, Sr. | B60F 5/02 244/2 |
| 2011/0315806 | A1 * | 12/2011 | Piasecki | G05D 1/102 244/2 |
| 2013/0026303 | A1 * | 1/2013 | Wang | B64C 3/54 244/7 R |
| 2013/0026304 | A1 * | 1/2013 | Wang | B64C 29/0033 244/7 R |
| 2013/0068876 | A1 * | 3/2013 | Radu | B60F 5/02 244/2 |
| 2014/0158816 | A1 * | 6/2014 | Delorean | B64C 29/0033 244/12.4 |

* cited by examiner

AMPHIBIOUS VERTICAL TAKEOFF AND LANDING UNMANNED DEVICE

CROSS-REFERENCE TO RELATED APPLICATIONS

This application is a continuation-in-part of U.S. patent application Ser. No. 29/572,722, entitled "AMPHIBIOUS VTOL, HOVER, BACKWARD, LEFTWARD, RIGHTWARD, TURBOJET, TURBOFAN, ROCKET ENGINE, RAMJET, PULSE JET, AFTERBURNER, AND SCRAMJET SINGLE/DUAL ALL IN ONE JET ENGINE (FUEL/ELECTRICITY) WITH ONBOARD SELF COMPUTER BASED AUTONOMOUS MODULE GIMBALED SWIVEL PROPULSION (GSP) SYSTEM DEVICE, SAME AS DUCTED FAN (FUEL/ELECTRICITY)", filed on Jul. 29, 2016, U.S. patent application Ser. No. 29/567,712, entitled "AMPHIBIOUS VTOL, HOVER, BACKWARD, LEFTWARD, RIGHTWARD, TURBOJET, TURBOFAN, ROCKET ENGINE, RAMJET, PULSE JET, AFTERBURNER, AND SCRAMJET ALL IN ONE JET ENGINE (FUEL/ELECTRICITY) WITH ONBOARD SELF COMPUTER BASED AUTONOMOUS GIMBALED SWIVEL PROPULSION SYSTEM DEVICE", filed on Jun. 10, 2016, U.S. patent application Ser. No. 14/940,379, entitled "AMPHIBIOUS VERTICAL TAKEOFF AND LANDING UNMANNED SYSTEM AND FLYING CAR WITH MULTIPLE AERIAL AND AQUATIC FLIGHT MODES FOR CAPTURING PANORAMIC VIRTUAL REALITY VIEWS, INTERACTIVE VIDEO AND TRANSPORTATION WITH MOBILE AND WEARABLE APPLICATION", filed on Nov. 13, 2015, and U.S. patent application Ser. No. 15/345,349, entitled "SYSTEMS AND METHODS FOR MESSAGING, CALLING, DIGITAL MULTIMEDIA CAPTURE AND PAYMENT TRANSACTIONS", filed on Nov. 7, 2016, which is a continuation-in-part of U.S. patent application Ser. No. 14/957,644, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Dec. 3, 2015, which is a continuation-in-part of U.S. patent application Ser. No. 14/815,988, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Aug. 1, 2015, which claims priority to U.S. patent application Ser. No. 13/760,214, entitled "WEARABLE PERSONAL DIGITAL DEVICE FOR FACILITATING MOBILE DEVICE PAYMENTS AND PERSONAL USE", filed on Feb. 6, 2013, which is a continuation-in-part of U.S. patent application Ser. No. 10/677,098, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 30, 2003, which claims priority to Provisional Application No. 60/415,546, entitled "DATA PROCESSING SYSTEM", filed on Oct. 1, 2002, which are incorporated herein by reference in their entirety.

FIELD

This application relates generally to the field of automobiles, and more particularly to a type of device that can be converted into an automotive type vehicle capable of flying on air, sometimes popularly referred to as a "flying car" or "flying jet vehicle".

BACKGROUND

Henry Ford once stated, "Mark my word: A combination airplane and motorcar is coming. You may smile. But it will come" (Henry Ford, Chairman, Ford Motor Company-1940). In fact, shortly after the Wright brothers' first flight, people have been looking for ways to combine aircraft and automobiles into one vehicle. In 1918, Felix Longobardi was issued the first patent (U.S. Pat. No. 1,286,679) for a multi-use vehicle also known as a roadable aircraft. Throughout the following 88 years, there have been numerous patents issued for vehicle concepts that are capable of both flying and driving. While there has been no shortage of inventions in this field, there have been no concepts, which have met with commercial success. And there is no flying car used jet engines and putting two devices into one with both electricity and fuel.

The reasons for the lack of commercial success for the numerous previous roadable aircraft patents are as varied as the patents themselves. Some failed because the design was infeasible or unsafe. Others failed because the design was too complicated or too expensive to manufacturer, while most did not satisfy the customer's need. Regardless of the specific reason, to this day no design appears to have been practical enough to become a commercial success.

This is not too surprising when one considers the difference between an aircraft and automobile that must be reconciled for such a combination vehicle to be practical. One difference is the aircraft's wings. For flight, an aircraft requires long, high-aspect ratio wings. The high aspect ratio allows for increased efficiency and performance. In order for the vehicle to drive on the road, the wings must be dealt with. Most roadable aircraft can be classified by how they deal with the wings and tail of the vehicle when in driving mode. These classes are: VTOL (vertical take-off and landing), modular, and integrated.

VTOL aircraft typically either have very short wings or no wings at all. The idea is that if one is tired of being stuck in traffic, one could push a button, take off straight up and fly over the traffic jam. However, VTOL aircraft are much more akin to helicopters than the 'hovercraft' envisioned as flying cars. As with helicopters, VTOL vehicles generate lift by either helicopter-like blades or ducted fans, which force a large amount of air downwards. This downwash will generally kick up a lot of dirt and rocks. The debris would be thrown into the neighbouring cars and pedestrians thus making the idea of taking off in the middle of traffic infeasible. As a result, VTOL aircraft are generally restricted to taking off from a helipad or remote area away from persons and property. Further, because of the complexity, numbers of parts, and stability issues, VTOL aircrafts are inherently complex and expensive to develop, build and maintain.

Modular aircraft typically look like traditional aircraft when the vehicle is configured for flight. When configured for driving, the vehicle's wings (and usually the tail section) are removed from the aircraft. This creates two problems. First, the vehicle's operator must manually remove the wings for driving and reattach the wings for flight. Some vehicles allow for a single operator to perform the function, while others require multiple persons. Regardless of the design, many operators do not feel comfortable in their own skills to attach the wings safely to the aircraft. Also, when the wings and tail are removed, the question becomes one of what to do with them. If the wings are left at the airport, then the operator must return to that same airport in order to fly. This defeats the freedom of having a roadable aircraft. Some modular aircraft solve this problem by allowing the wings to be towed behind the vehicle. The '939 patent is an example of a modular aircraft where the wings and tail are towed behind the vehicle.

Integrated aircraft keep the wings attached to the vehicle at all times. Typically, the wings are folded, either mechanically or manually, alongside or in the body of the vehicle. An integrated vehicle with mechanically operated wings allows for the operator of the vehicle to convert from aircraft mode to automobile mode at the 'touch of a button'. This may add a considerable amount of practicality to the vehicle.

Besides the wings, another aspect of an aircraft that is not directly compatible with an automobile is the propeller. The propeller is the most sensitive part of the aircraft to nicks and dents. Because of this, pilots are trained to run their hand over the propeller before each flight to check for damage. When driving down the road, rocks and other debris are often kicked up by traffic. In modular designs, the propeller is typically part of the structure that is removed in order to convert the vehicle into an automobile. Therefore, modular designs typically do not have to worry about the propeller when the vehicle is configured for driving. For integrated designs, the propeller is either removed, such as in U.S. Pat. No. 2,430,869, left attached to front of the vehicle (such as in the "Fusion" vehicle by Steve Nichols), or left attached to the rear of the vehicle. Some vehicles, which leave the propeller attached to the rear of the fuselage, allow the propeller to hang below the vehicle where it is still susceptible to road debris (such as in U.S. Pat. No. 3,371,886). In order to be practical, the propeller should be protected from road debris at all times, without the need for the operator to manually remove the propeller.

An aspect of an automobile that is not directly compatible with an aircraft is the fact that the back of an automobile is typically a blunt surface. The reason for this includes the need for a rear bumper, indicator lights (such as turn signals) and identification devices (such as license plates). Aircraft, on the other hand, have sharp trailing edges to reduce the aerodynamic drag while in flight. Having a blunt surface, such as that on the back of an automobile, would produce a substantial amount of drag on the vehicle when in the air. This extra drag is at least inefficient and may be unacceptable. Modular designs with removable tail structures can hide the rear bumper and lights within the structure of the tail. However, integrated designs must deal with this problem. The prior art vehicles do not appear to address this issue. Either the vehicle has an automotive style aft end and takes the penalty in increased drag, or the vehicle has an aircraft aft end and does not address the need for bumpers or automotive lighting.

Finally, automobiles are typically designed to be strong and sturdy in order to survive the harsh environment of the road including potholes, bumps, curbs and other typical road hazards. This causes automobiles to be heavier than aircraft, which only have to deal with runways that are usually well paved. Fortunately, material technology is available now that allows for strong reliable structure at a fraction of the weight of previous automotive structures.

As such, while a number of flying car designs have been contemplated or produced, these designs have in general been impractical for use as general purpose driving and flying vehicles capable of meeting road and air vehicle safety standards. Also existing flying car have many technical problems, such as a car will change shape, leading to the volume, the weight is increased, limiting the travel of the land vehicle drivability and flexibility. Thus, there is need for a flying car with more flexibility and driveability, which overcomes the aforementioned complications.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

An important object of the present invention is to provide a vehicle construction, which may be employed with equal facility as a car or as an aircraft for travelling on the road as well as on air.

In another object, the invention contemplates a vehicle that is compact and capable of flying with great facility and great speed and provided with great lifting power, in any medium, such as air, land and/or water, and readily, and automatically convertible from one use to another, without loss of time or necessity of getting out of the vehicle.

Yet another objective of the invention is to provide a vehicle of this type with parachutes at the top center of the body of the vehicle, wherein parachutes are adapted to be ejected automatically, under all conditions or when the engines have stopped operating during flight, permitting a safe landing.

Further objective of the invention is to facilitate the design as it was too complicated or too expensive to manufacturer, while most did not satisfy the customer's need.

These objectives are achieved by the system according to the invention, which is a flying car, having a body, adapted for carrying the payload from once place to another, a tail attached to body at rear end adapted for stabilizing the vehicle, a head at body front end adapted for takeoff, plurality of wheels at the bottom of car connected to a power transmission system, plurality of foldable wings on the sides of body, adapted for creating the pressure difference and creating lift to the vehicle. Further, plurality of jet engines adapted for driving the jet flying car on surface as well as on air. A thrust vector control, to controls the direction of the thrust generated by the engines. And plurality of parachutes attached to the flying jet car to safe land the flying jet car under emergency.

In further exemplary embodiments, modules, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
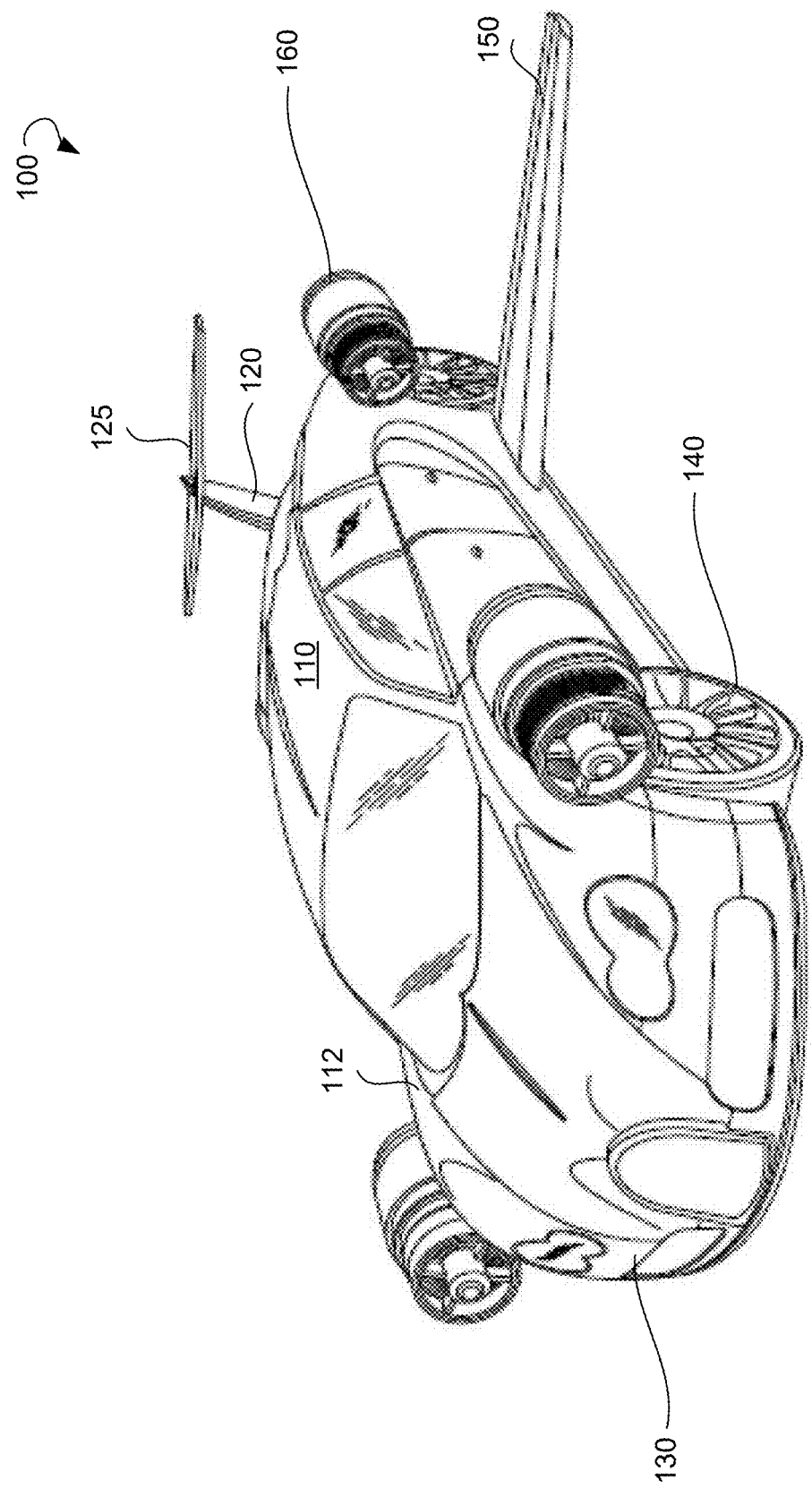
FIG. 1 is a close up of the isometric view of the flying jet car, according to an embodiment of the present invention.
Figure 2:
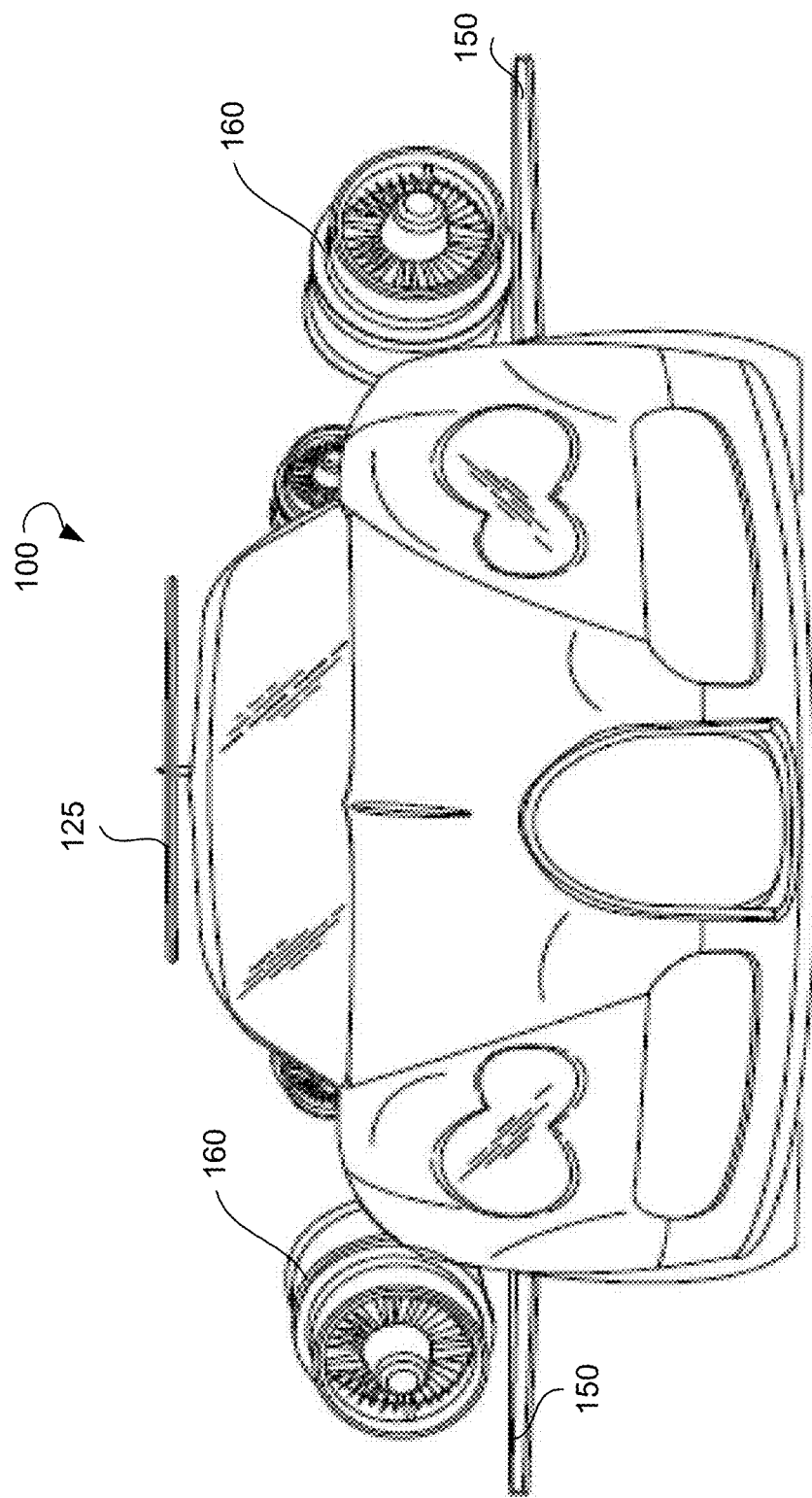
FIG. 2 is a close up of the front view of the flying jet car, according to an embodiment of the present invention.
Figure 3:
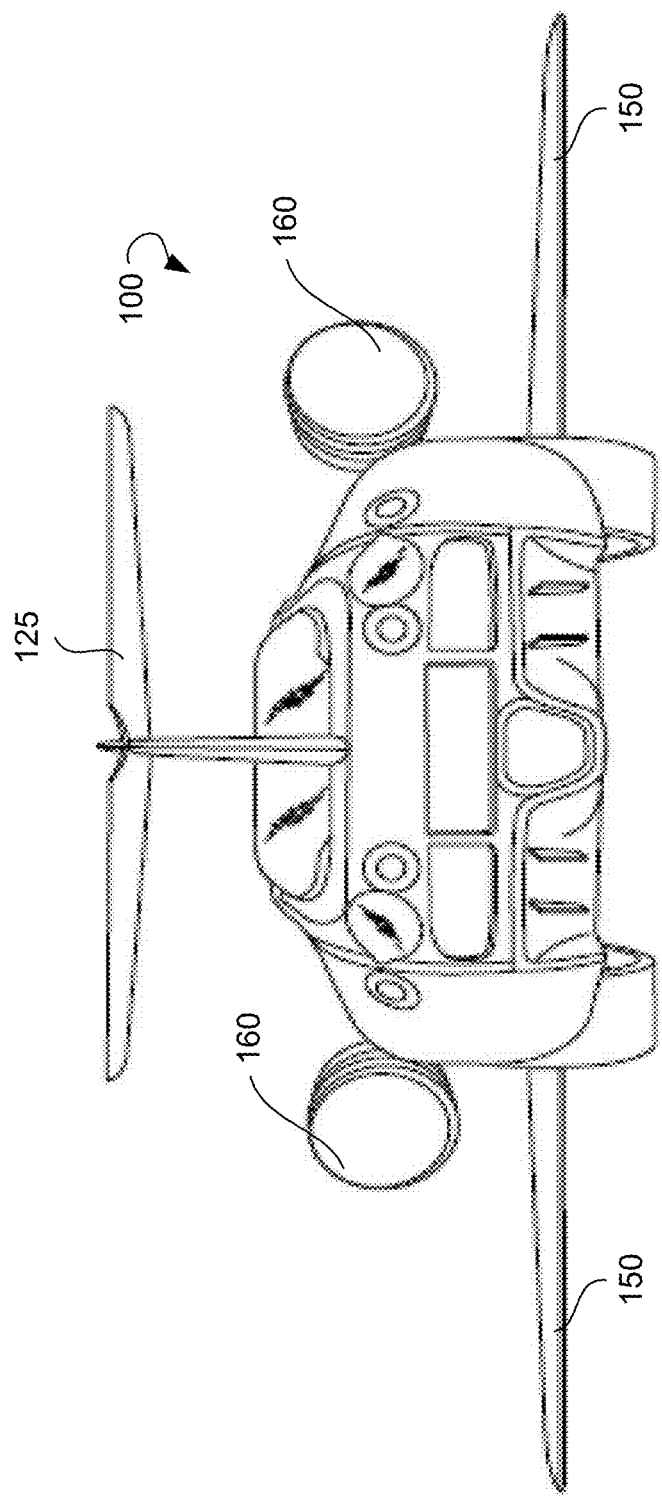
FIG. 3 is a close up of the rear view of the flying jet car, according to an embodiment of the present invention.
Figure 4:
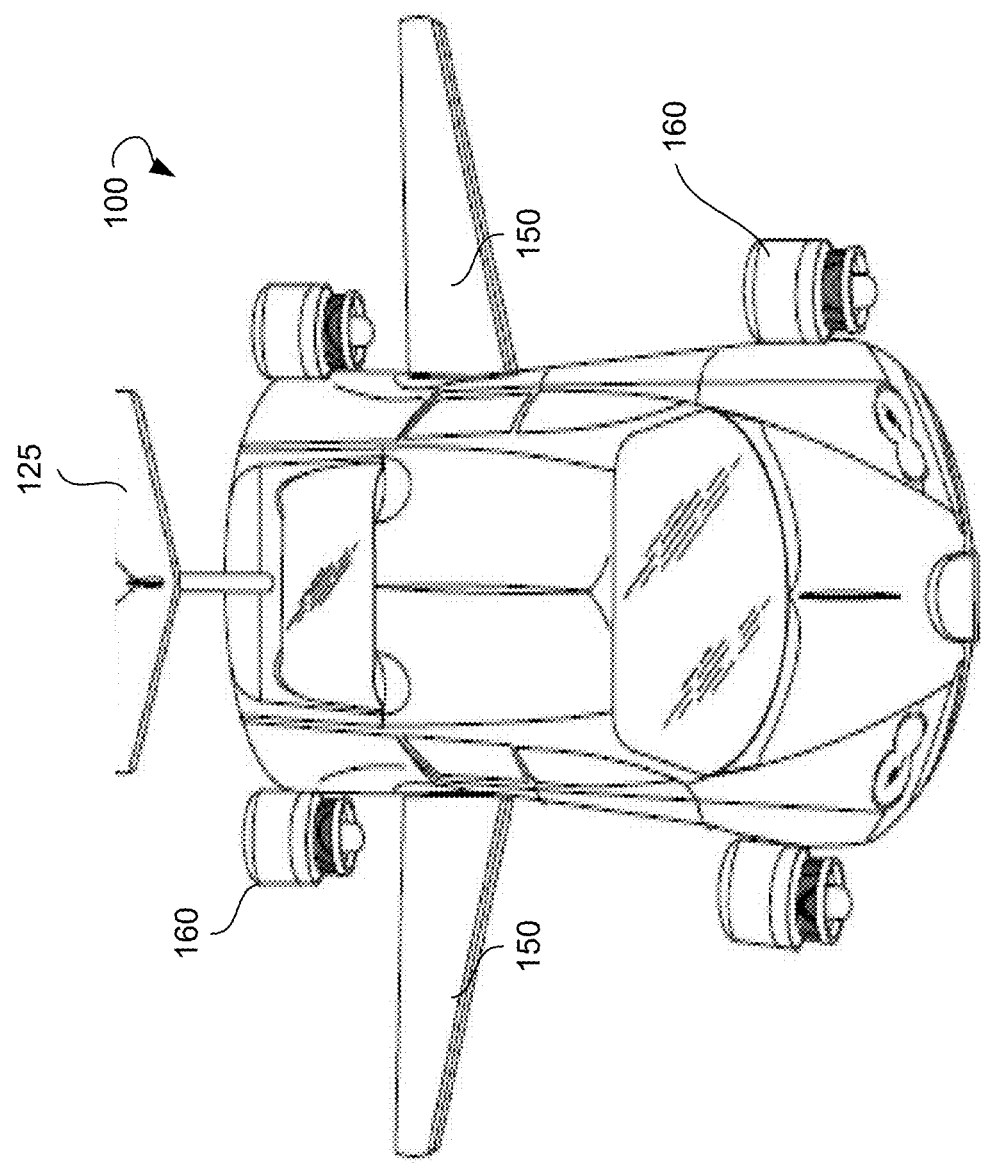
FIG. 4 is a close up of the top view of the flying jet car, according to an embodiment of the present invention.
Figure 5:
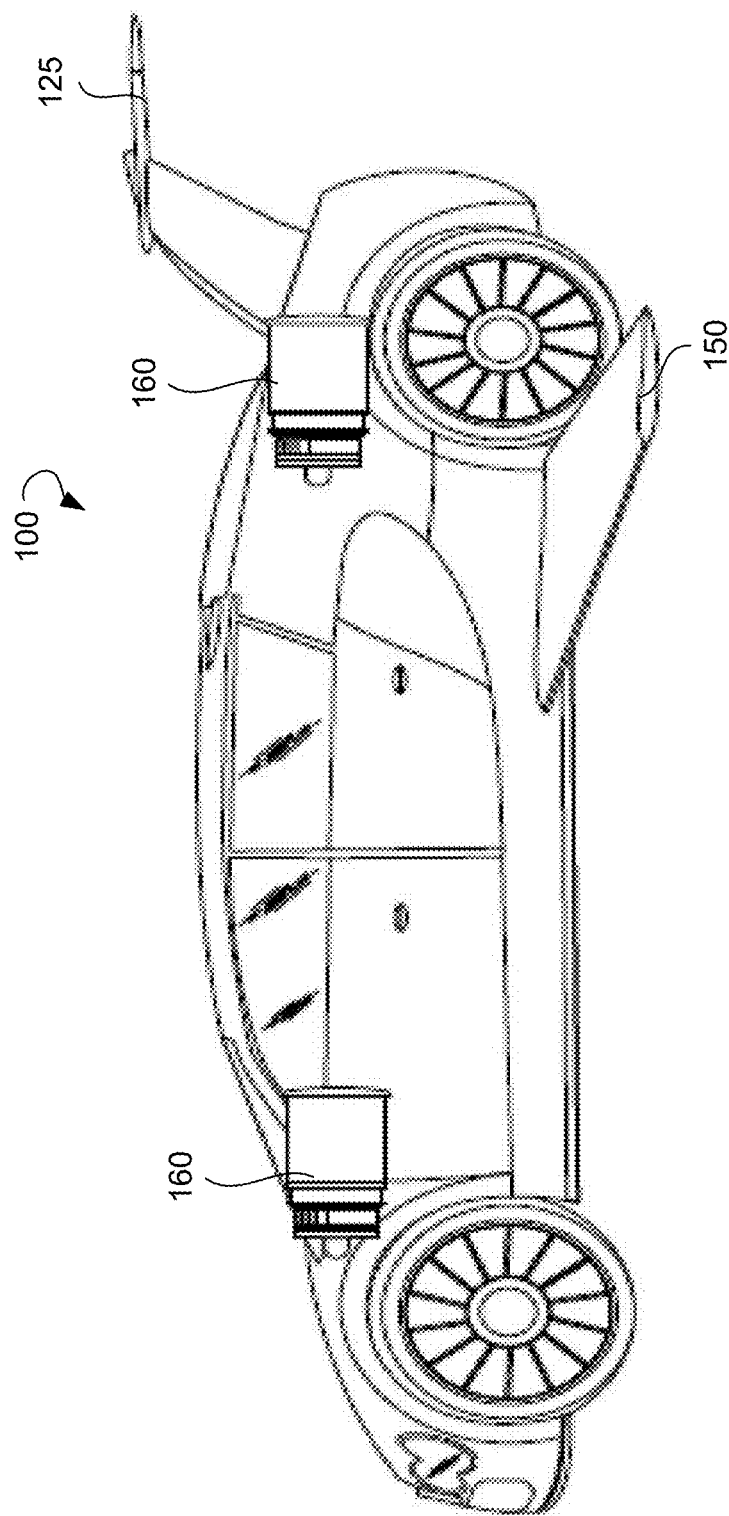
FIG. 5 is a close up of the left view of the flying jet car, according to an embodiment of the present invention.
Figure 6:
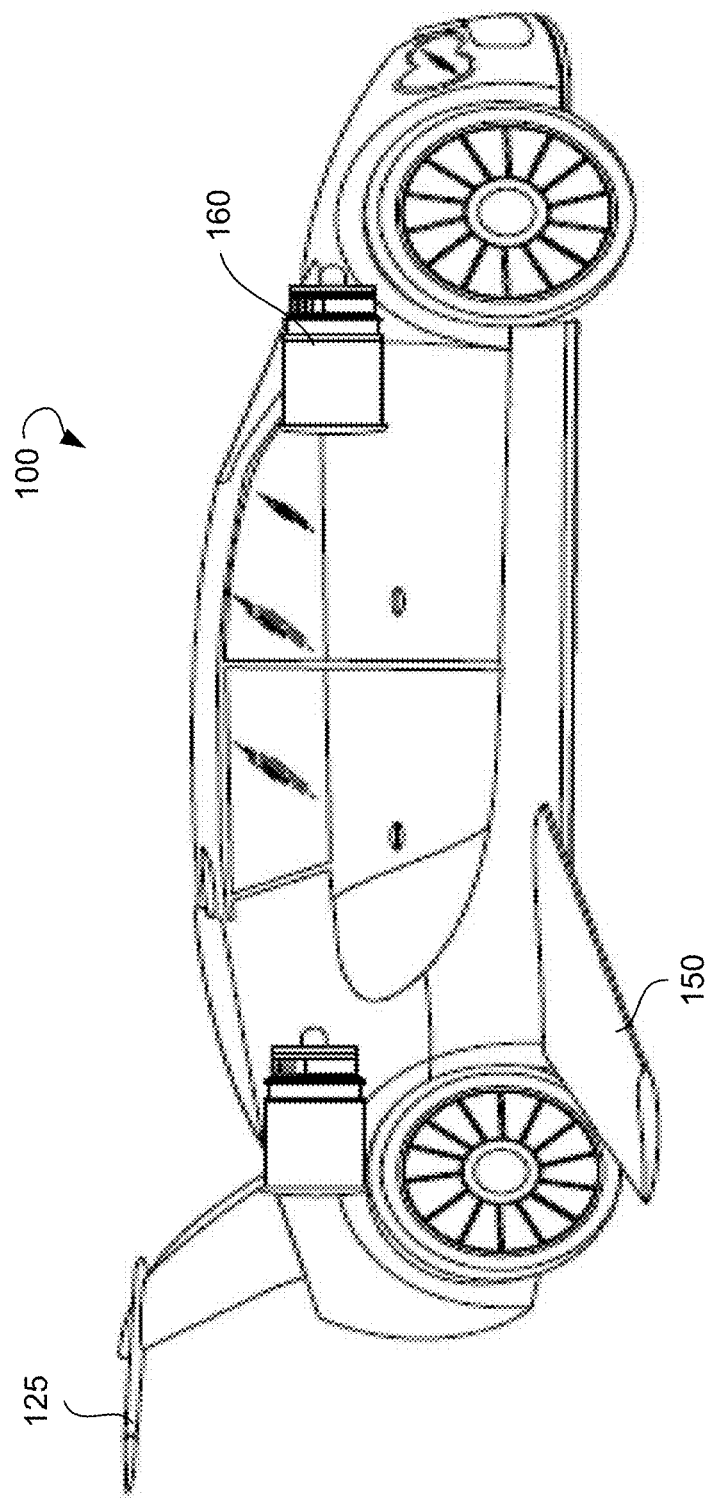
FIG. 6 is a close up of the right view of the flying jet car, according to an embodiment of the present invention.
Figure 7:
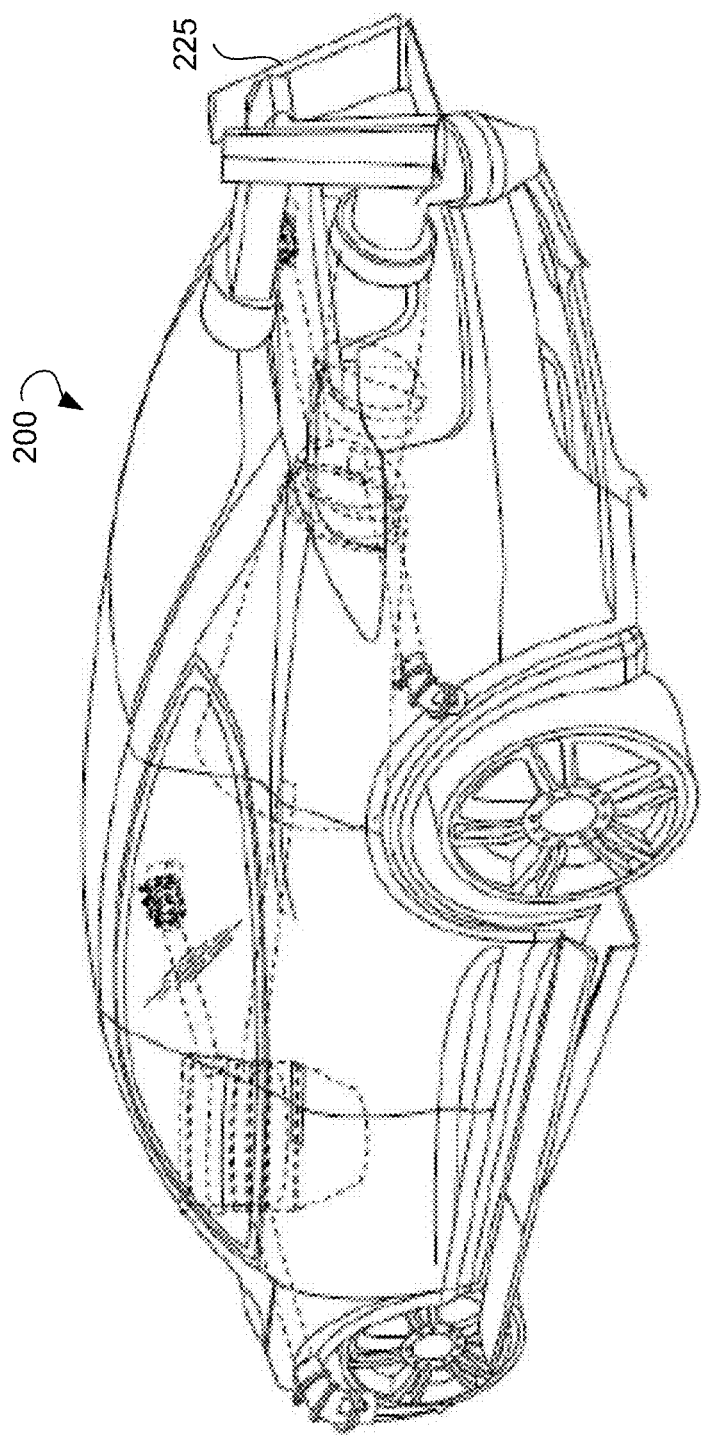
FIG. 7 is a close up of the isometric view of flying jet car with tail wing in normal position, according to an embodiment of the present invention.
Figure 8:
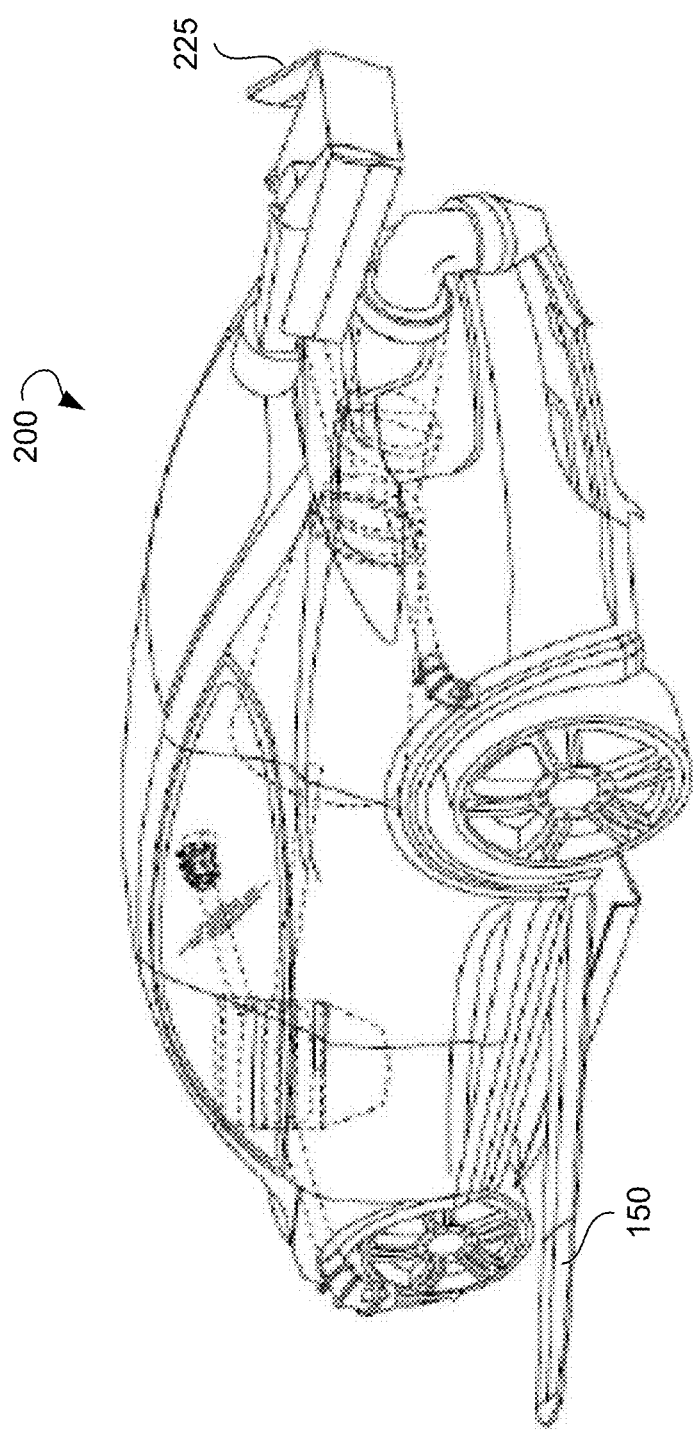
FIG. 8 is a close up of the isometric view of flying jet car with tail wing in swivelled position, according to an embodiment of the present invention.
Figure 9:
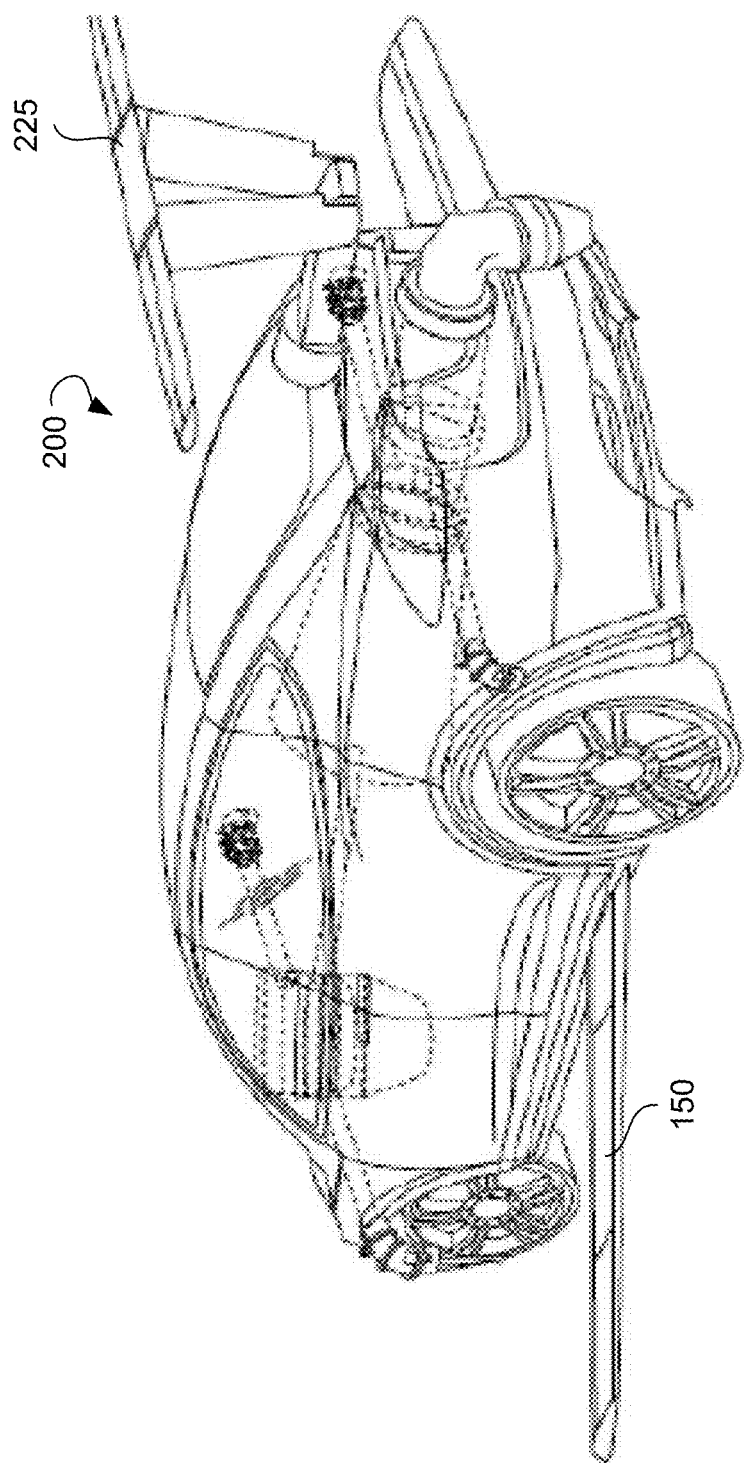
FIG. 9 is a close up of the isometric view of flying jet car with tail wing in upright position, according to an embodiment of the present invention.
Figure 10:
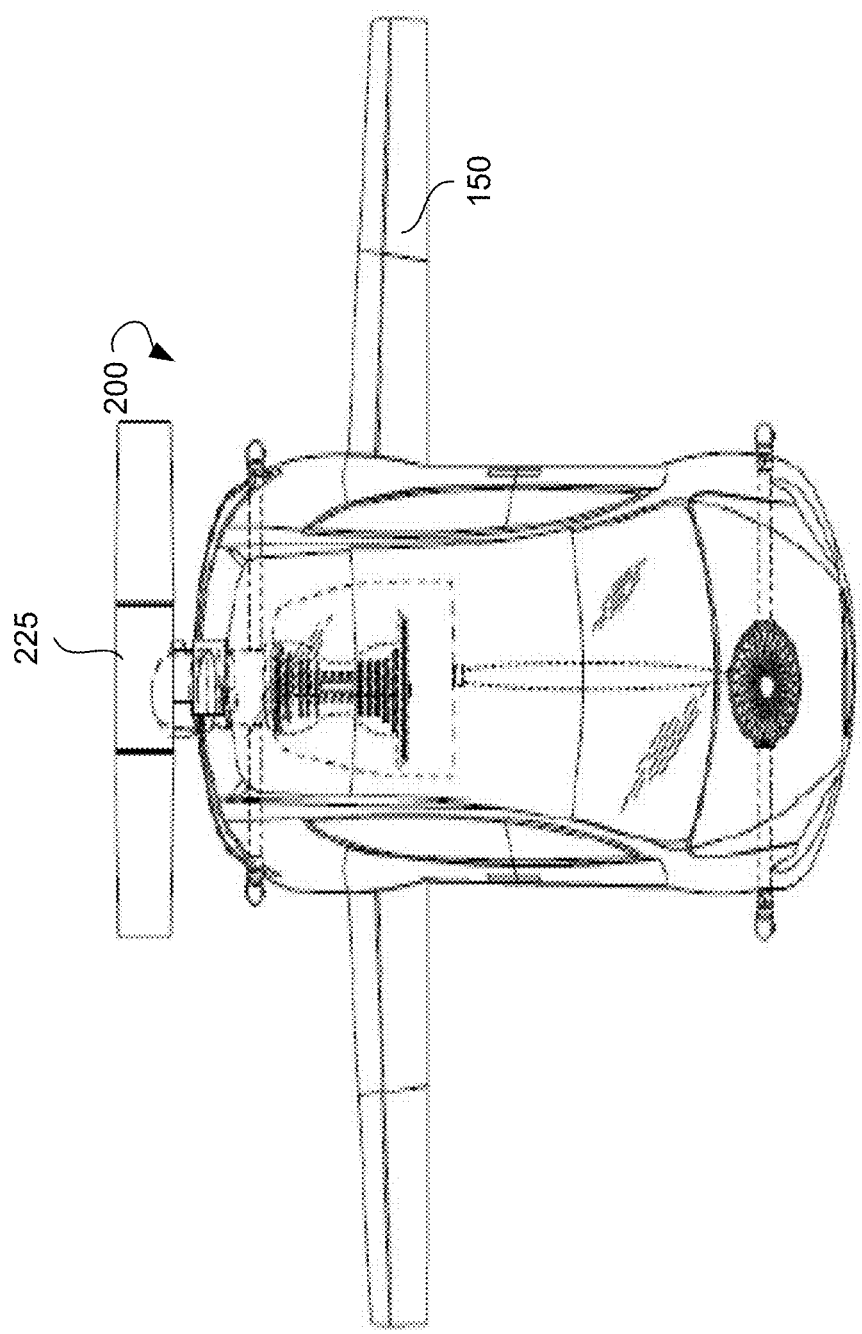
FIG. 10 is a close up of the top view of flying jet car with tail wing in upright position, according to an embodiment of the present invention.
Figure 11:
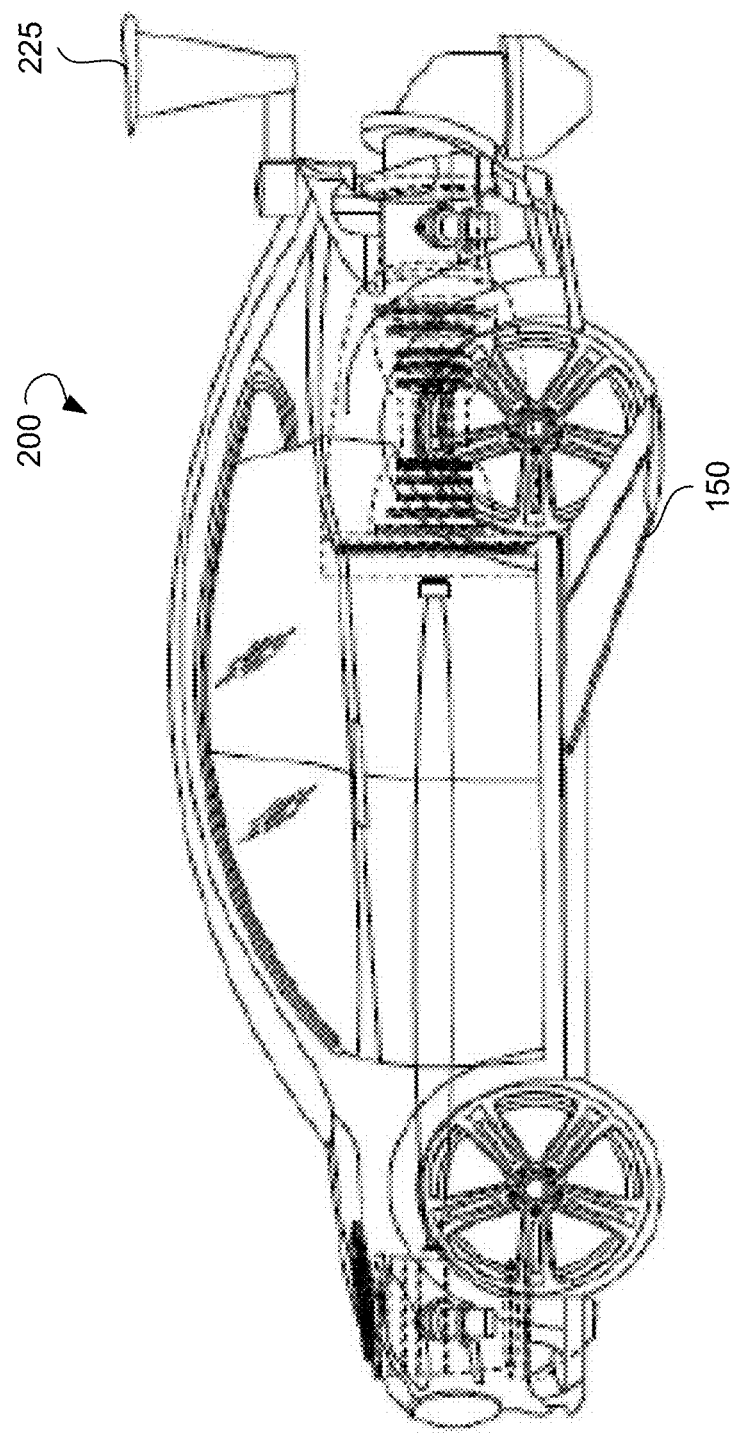
FIG. 11 is a close up of the left view of flying jet car with tail wing in upright position, according to an embodiment of the present invention.
Figure 12:
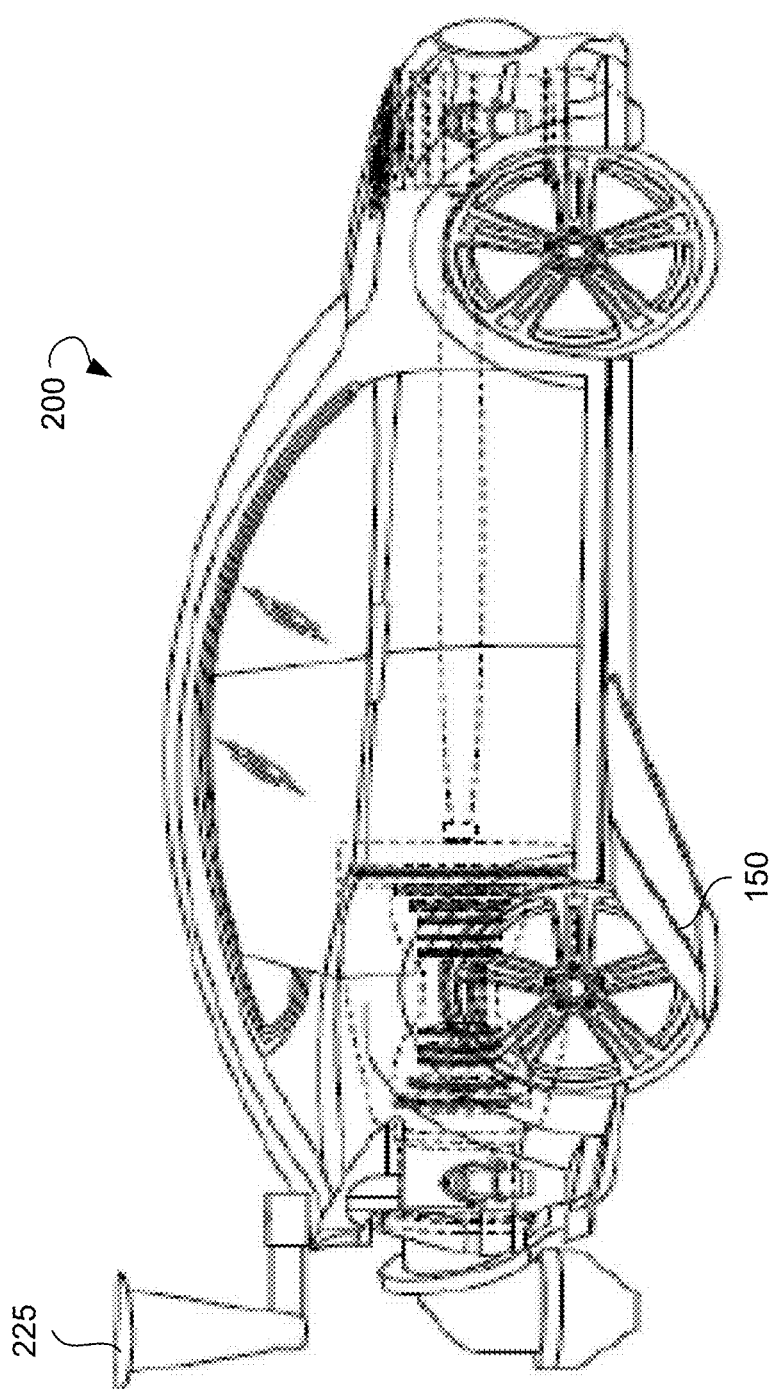
FIG. 12 is a close up of the right view of flying jet car with tail wing in upright position, according to an embodiment of the present invention.
Figure 13:
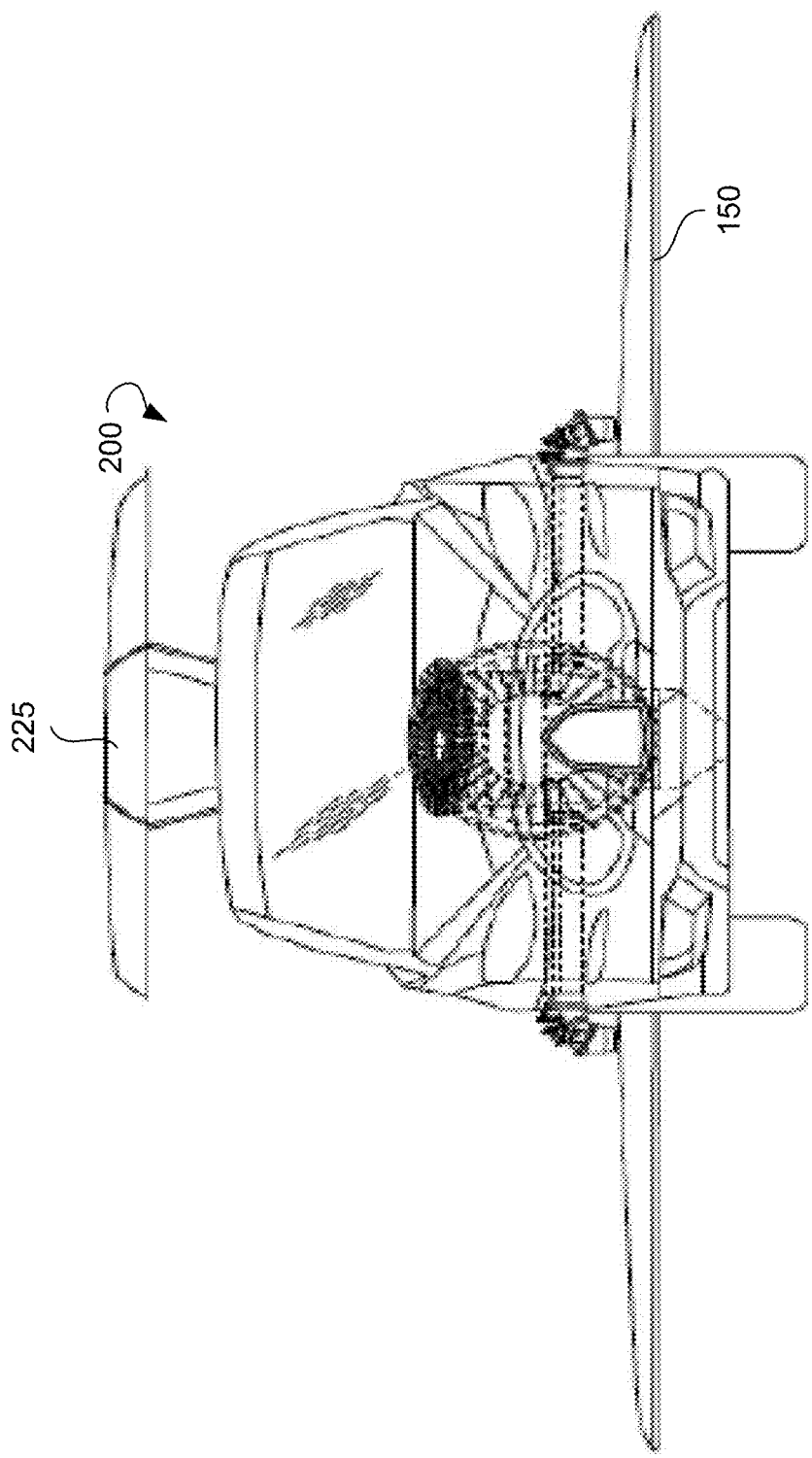
FIG. 13 is a close up of the front view of flying jet car with tail wing in upright position, according to an embodiment of the present invention.
Figure 14:
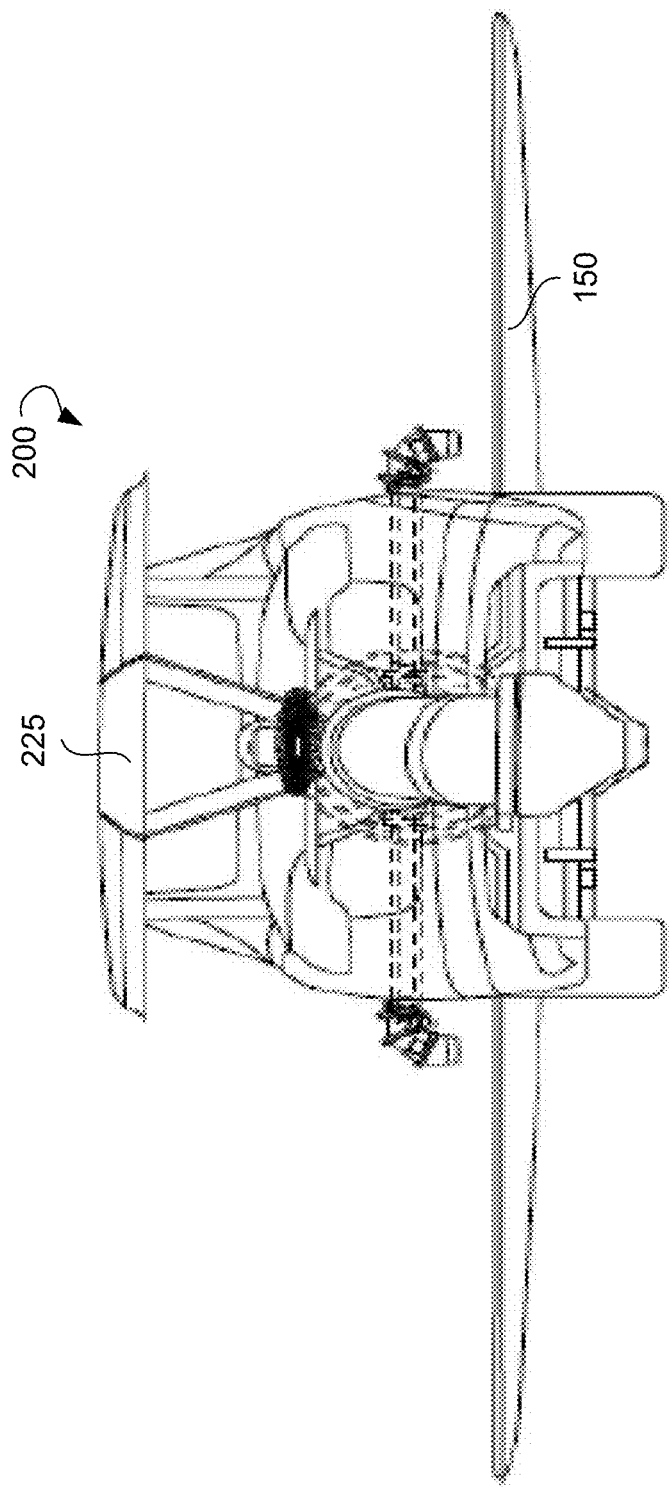
FIG. 14 is a close up of the rear view of flying jet car with tail wing in upright position, according to an embodiment of the present invention.
Figure 15:
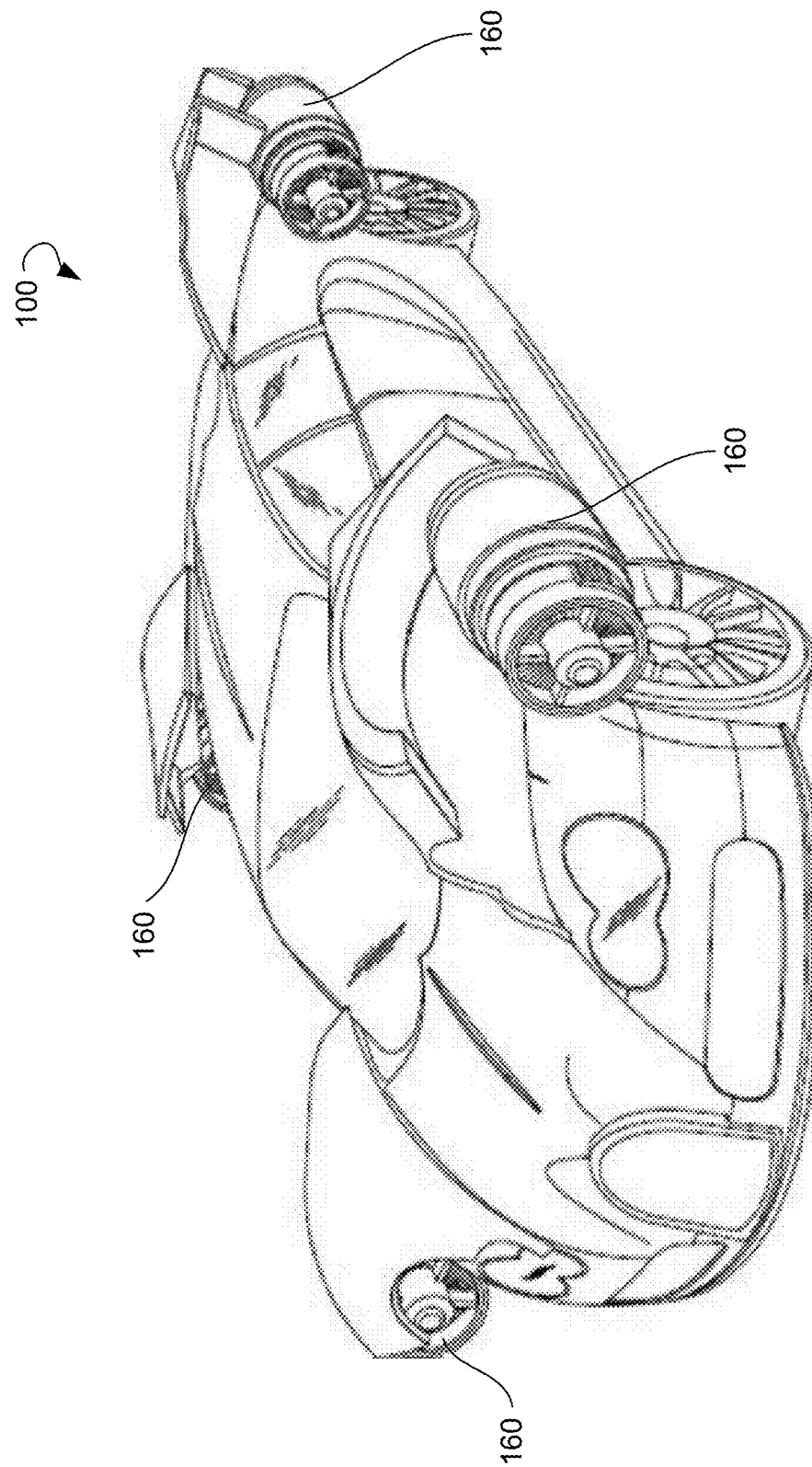
FIG. 15 is a close up of the isometric view of the flying jet car with jet engine in normal position, according to an embodiment of the present invention.
Figure 16:
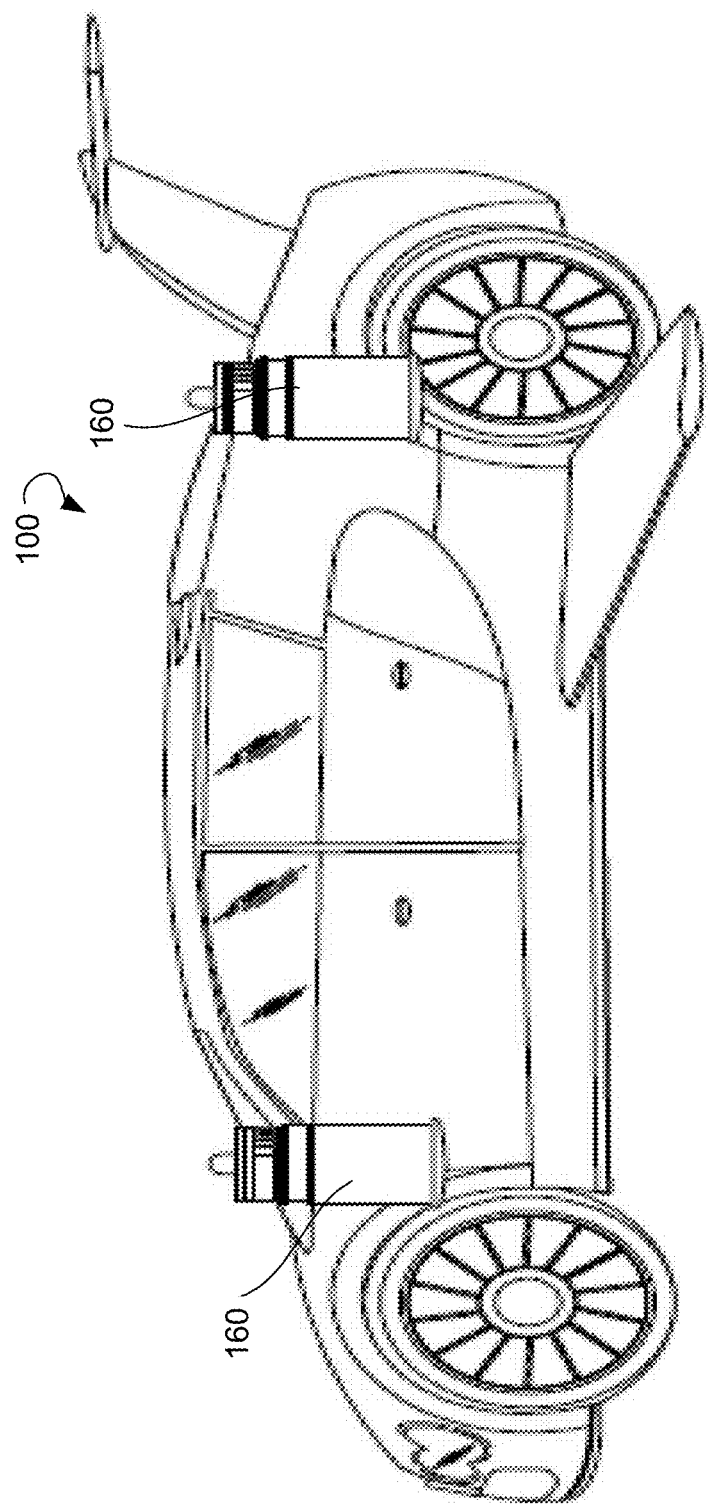
FIG. 16 is a close up of the left view of the flying jet car with jet engine in upright position, according to an embodiment of the present invention.
Figure 17:
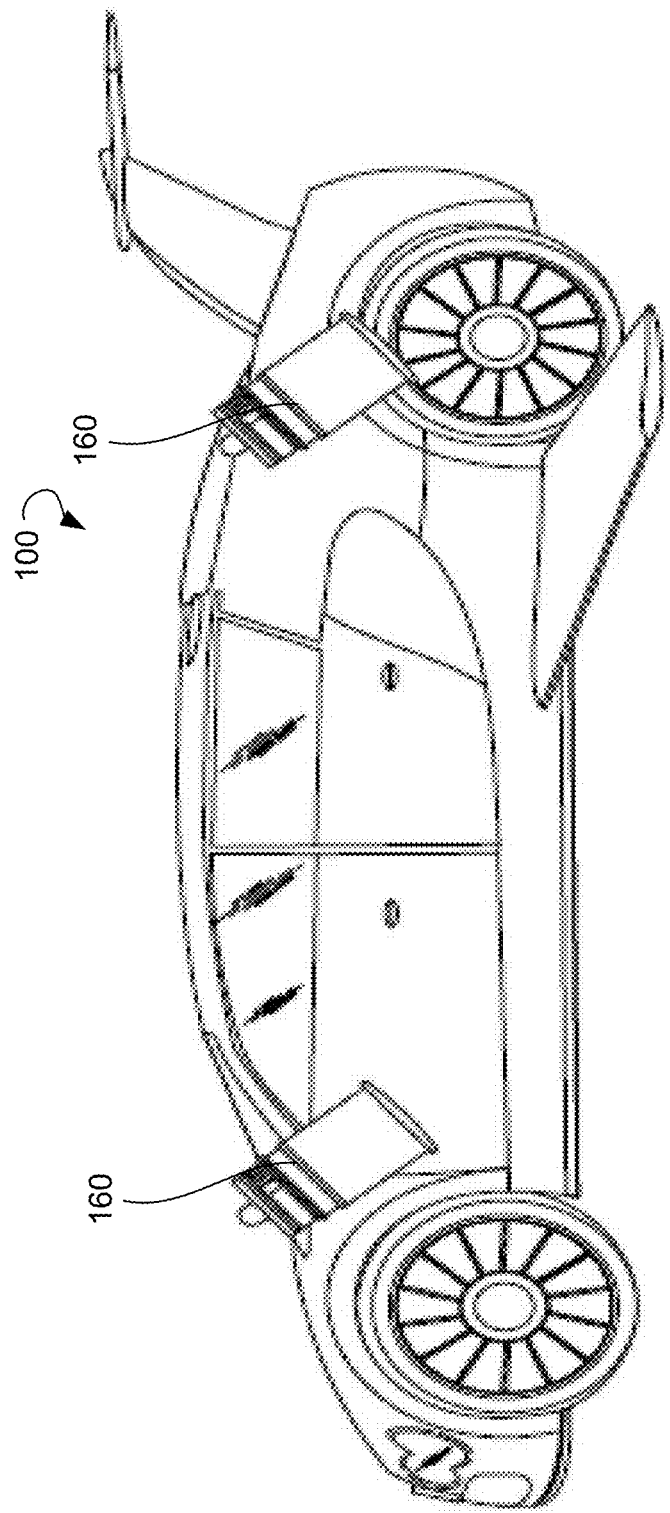
FIG. 17 is a close up of the left view of the flying jet car with jet engine in swivelled position, according to an embodiment of the present invention.
Figure 18:
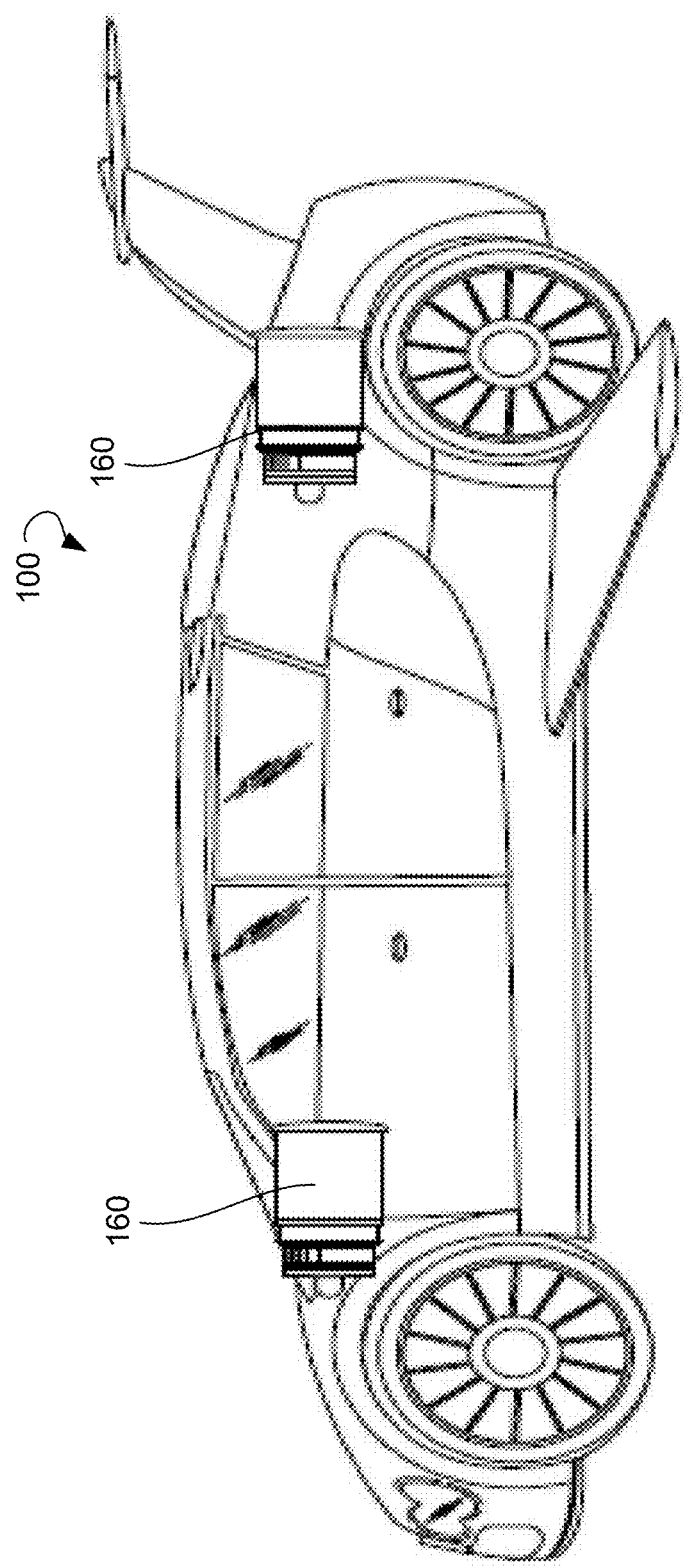
FIG. 18 is a close up of the left view of the flying jet car with jet engine in normal position, according to an embodiment of the present invention.
Figure 19:
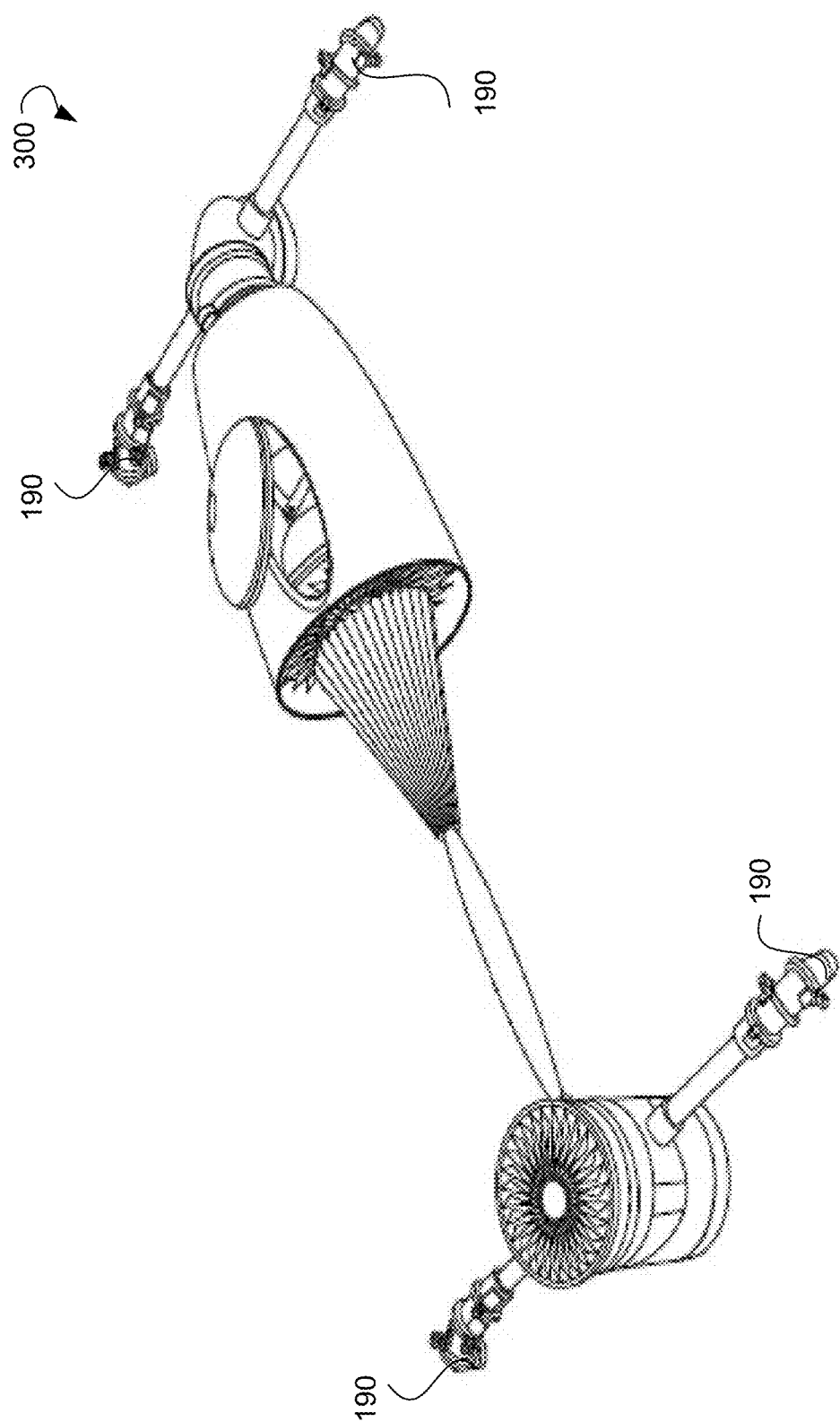
FIG. 19 is a close up of the isometric view of the jet engine, according to an embodiment of the present invention.
Figure 20:
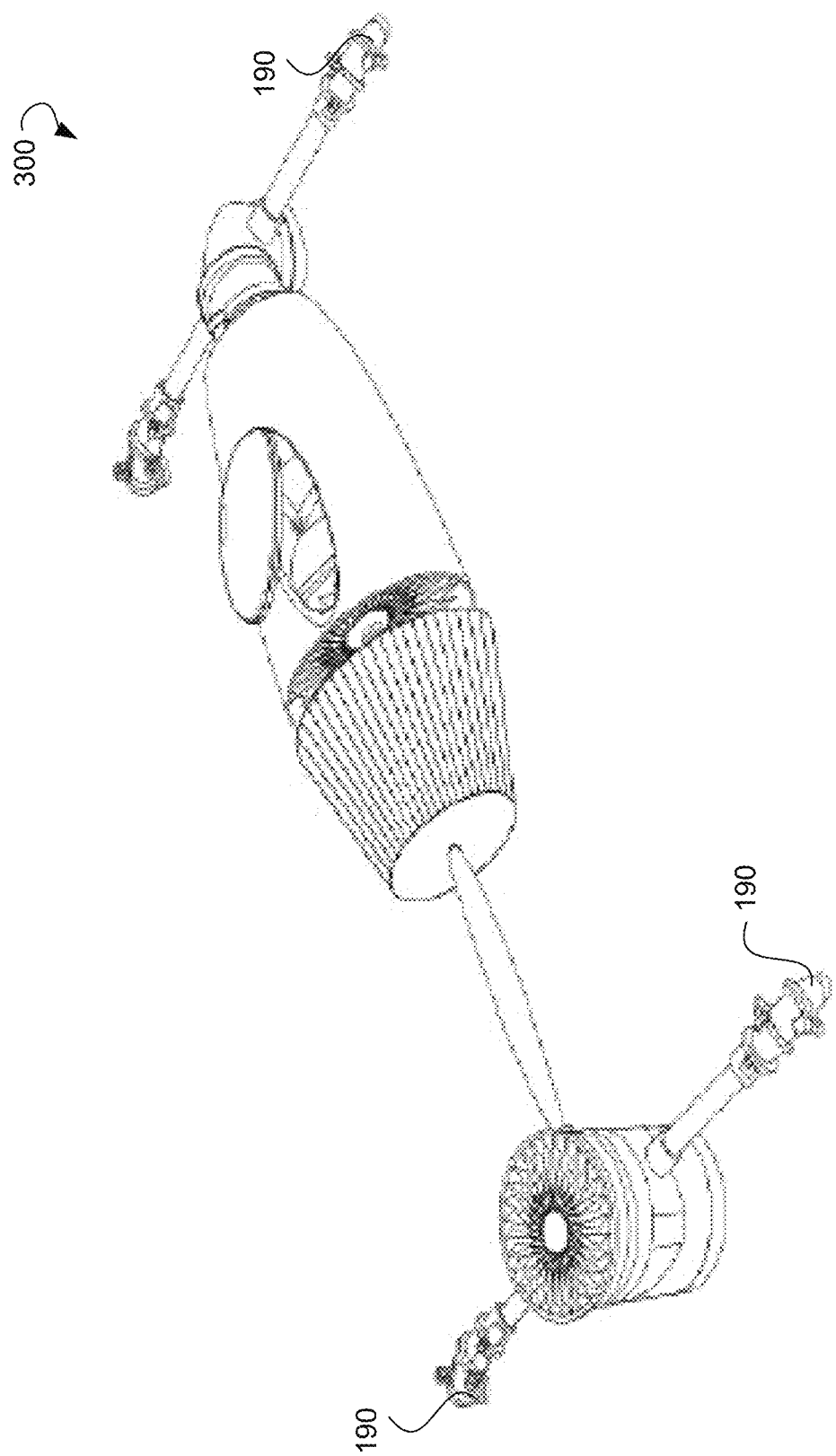
FIG. 20 is a close up of the isometric view of the jet engine, according to an embodiment of the present invention.
Figure 21:
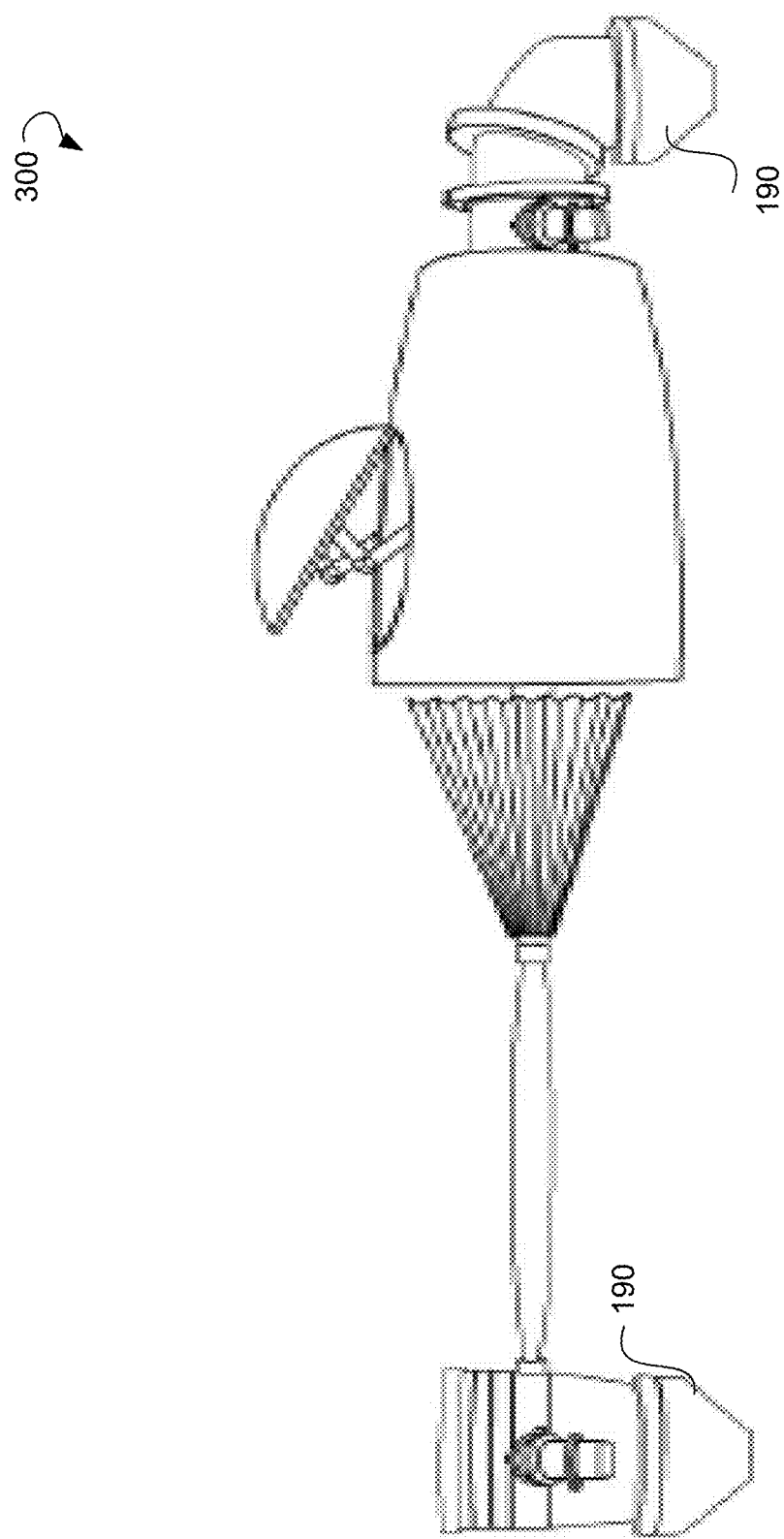
FIG. 21 is a close up of the left view of the jet engine, according to an embodiment of the present invention.
Figure 22:
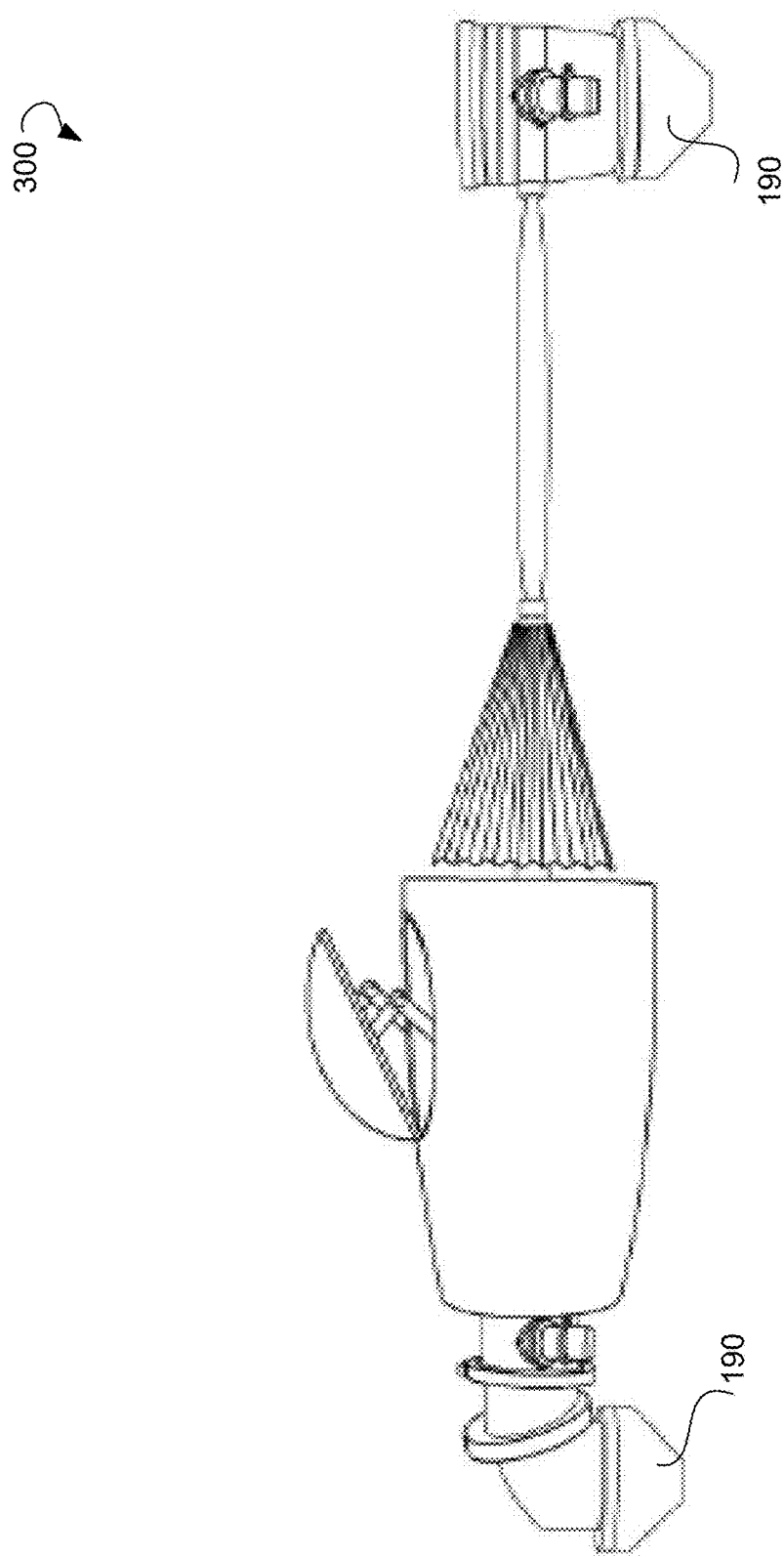
FIG. 22 is a close up of the right view of the jet engine, according to an embodiment of the present invention.
Figure 23:
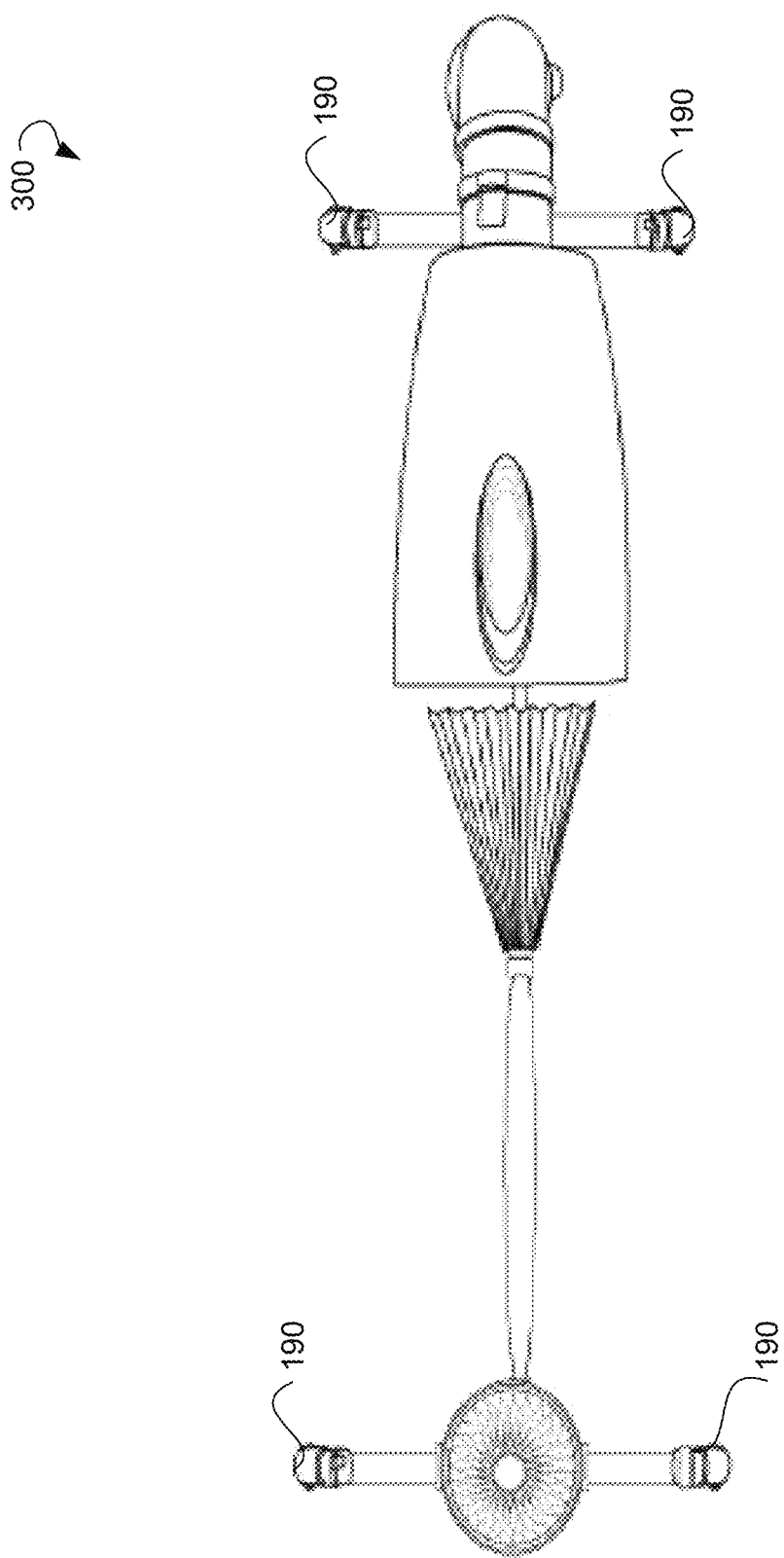
FIG. 23 is a close up of the top view of the jet engine, according to an embodiment of the present invention.
Figure 24:
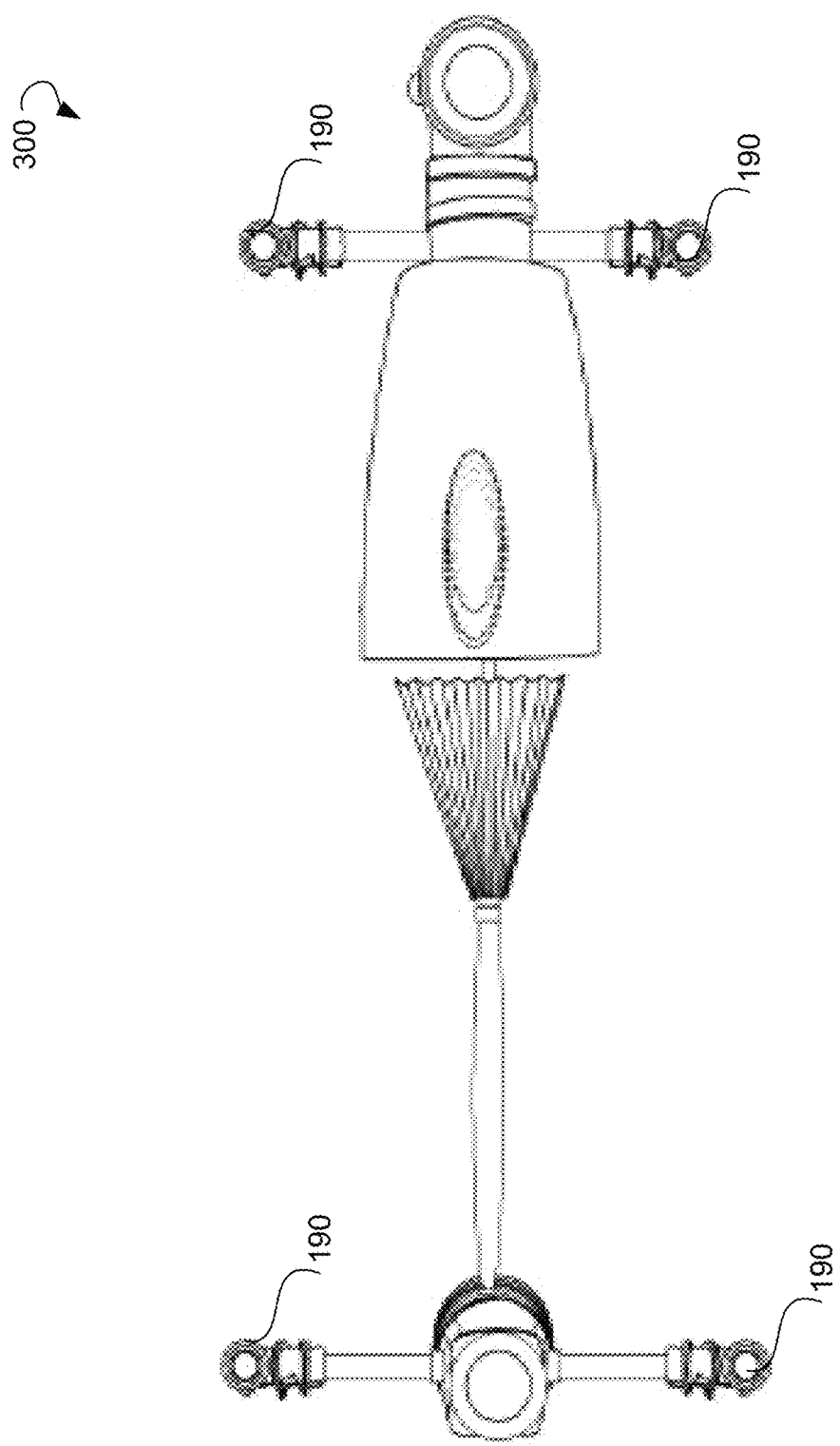
FIG. 24 is a close up of the bottom view of the jet engine, according to an embodiment of the present invention.
Figure 25:
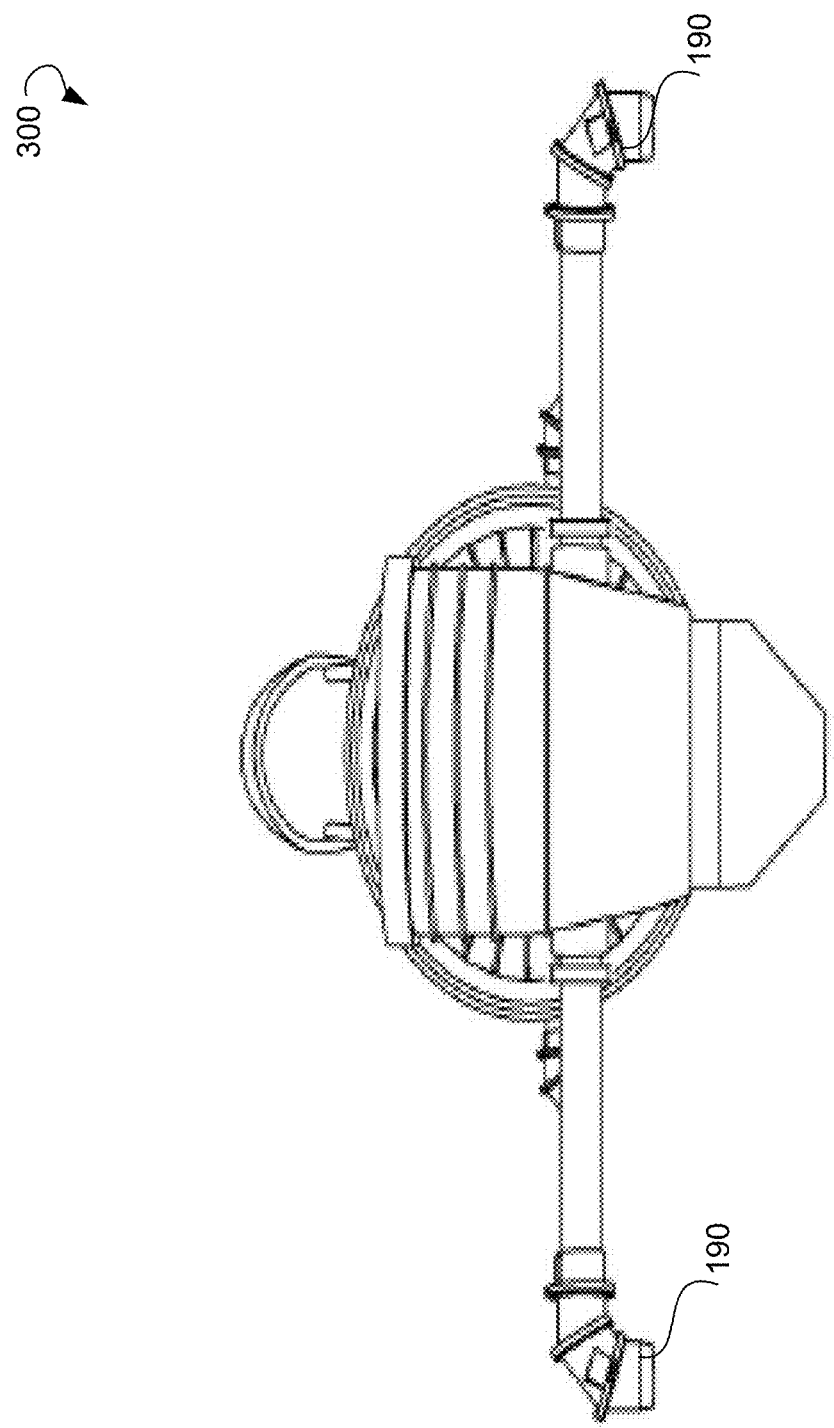
FIG. 25 is a close up of the front view of the jet engine, according to an embodiment of the present invention.
Figure 26:
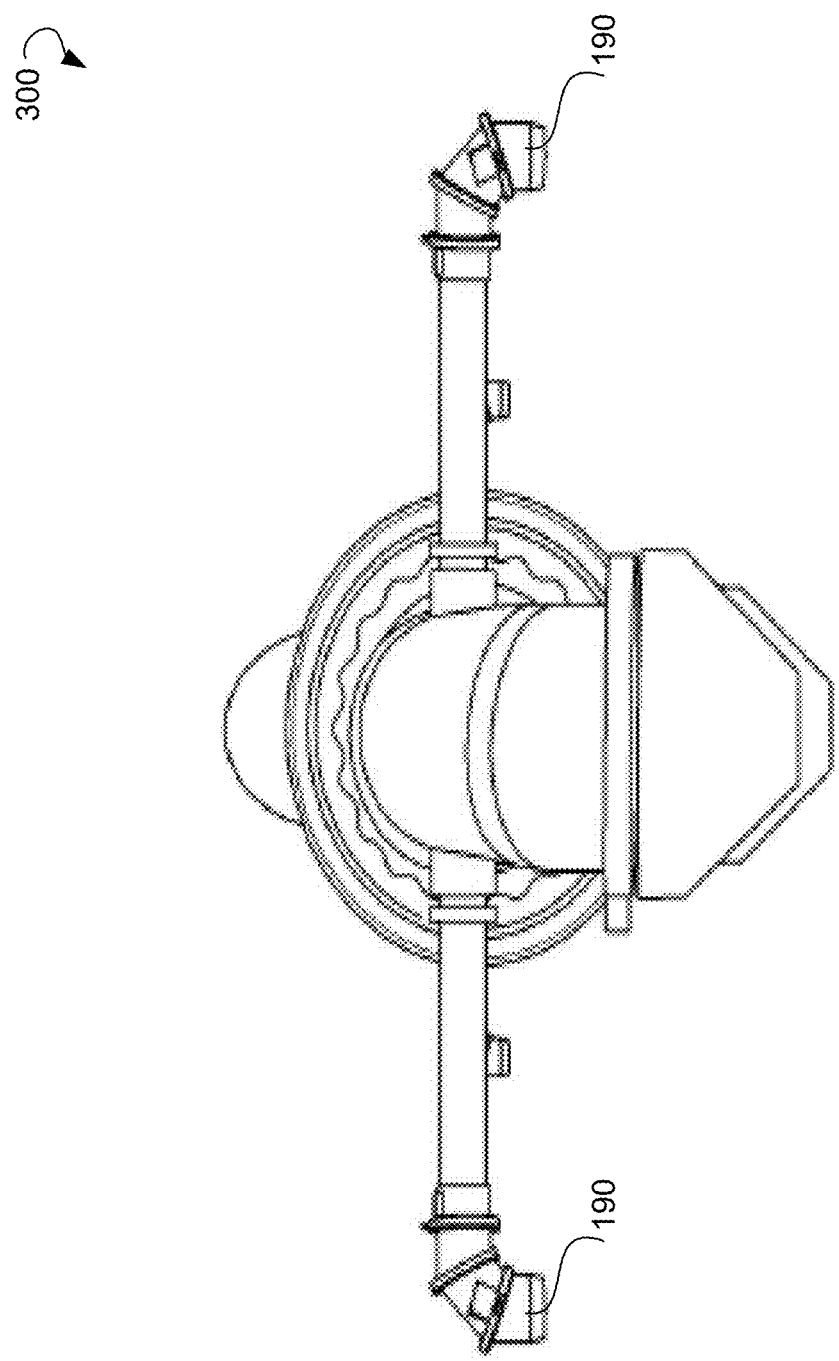
FIG. 26 is a close up of the rear view of the jet engine, according to an embodiment of the present invention.

All illustrations of the drawings are for the purpose of describing selected versions of the present invention and are not intended to limit the scope of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise.

FIG. 1 to FIG. 6 are the different views of an amphibious VTOL unmanned device shown as the flying jet car 100, according to an embodiment of the present invention. Referring to the figures, it can be understood that the present invention is a car also called as flying jet car 100 that operates in the manner of an aircraft but is sized and designed to be a personal vehicle. Flying jet car 100 comprises a modular and expandable waterproof body shown as a body 110 also called as fuselage in flight, adapted for carrying the payload from once place to another. An outer body shell 112 may be associated with the modular and expandable waterproof body and may comprise one or more pieces. A tail 120 attached to body 110 at rear end adapted for stabilizing the car and further comprises a tail 125 wing. The tail wing 125 also called as spoilers is tiltable type which spoils unfavourable air movement across a body 110 of a car in motion, usually described as turbulence or drag. The FIG. 7 to FIG. 14 shows the flying jet car 200 with a tail wing 225 in different positions, during various stages of the flight according to an embodiment of the present invention. The flying jet car 100 may have a head 130 at body 110 front end adapted for takeoff, plurality of wheels 140 at the bottom of car connected to a power transmission system (not shown), plurality of foldable wings 150 on the sides of body 110, adapted for creating the pressure difference and creating lift to the vehicle. The flying jet car 100 also has plurality of doors, a windshield, and a dashboard in its construction. The major portion of the flying jet car 100 is made of aluminium alloy.

Figure 39:
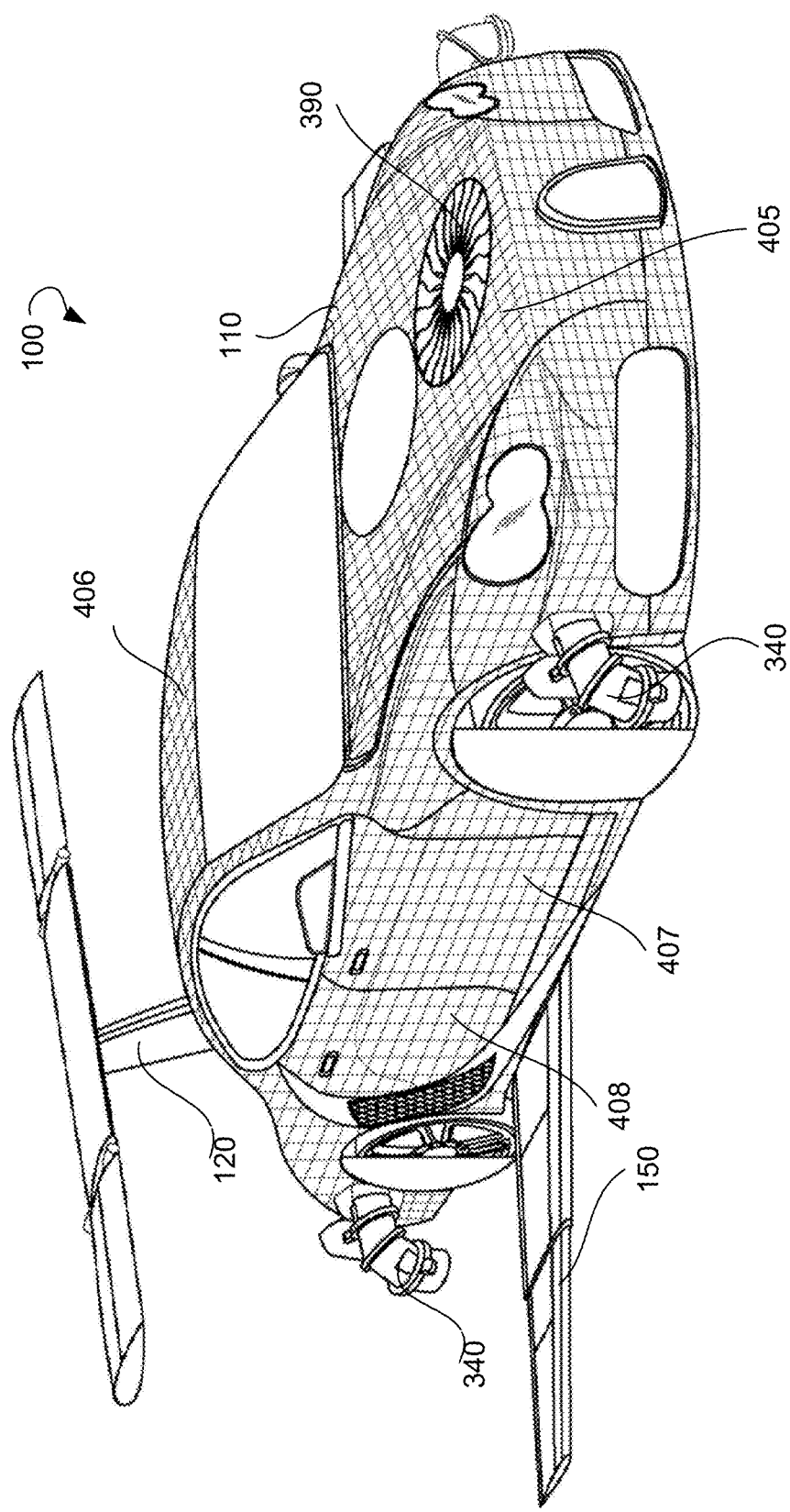
FIG. 39 is a perspective view of self-jet and solar cells powered all in one roadable aircraft with extended wings and all over solar cells except windows and lights of the present invention
Figure 40:
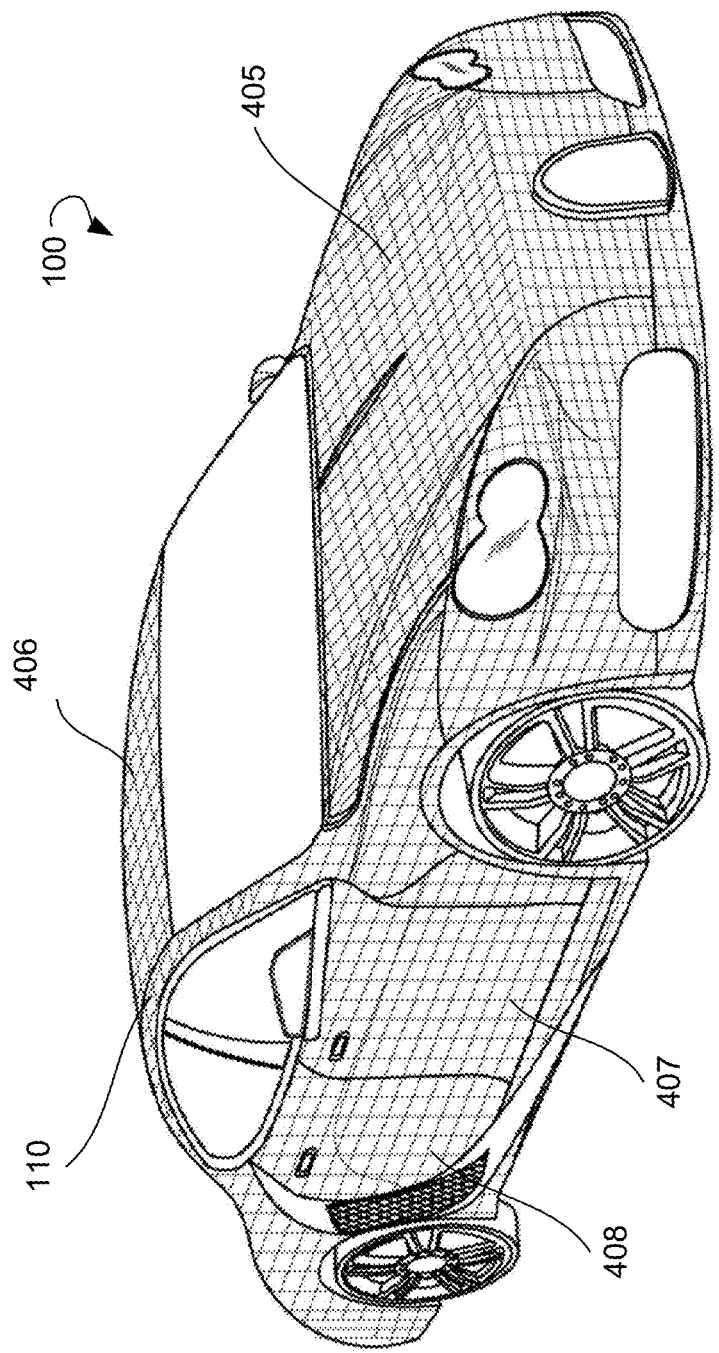
FIG. 40 is a perspective view of self-jet and solar cells powered electrical hybrid car without wings of the present invention.
Figure 41:
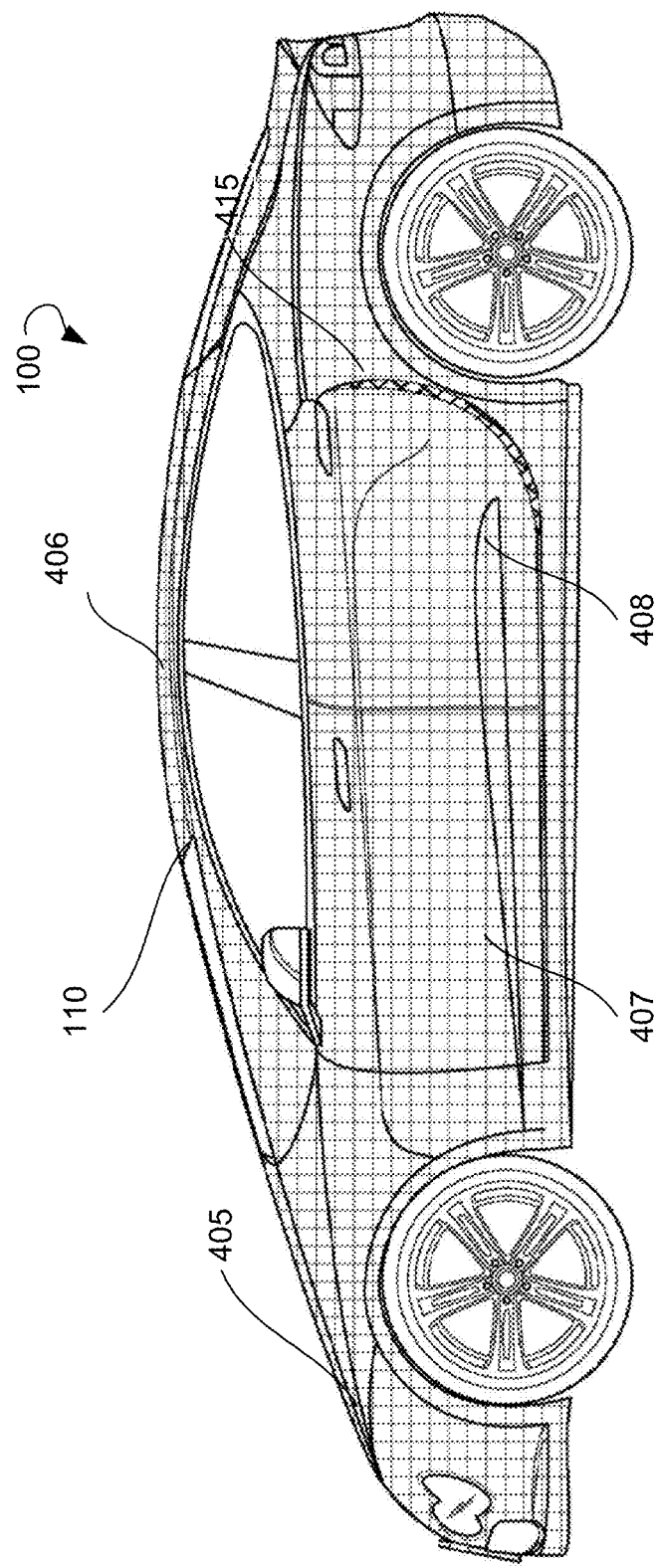
FIG. 41 is left side view of self-jet and solar cells powered electrical hybrid car of the present invention.
Figure 42:
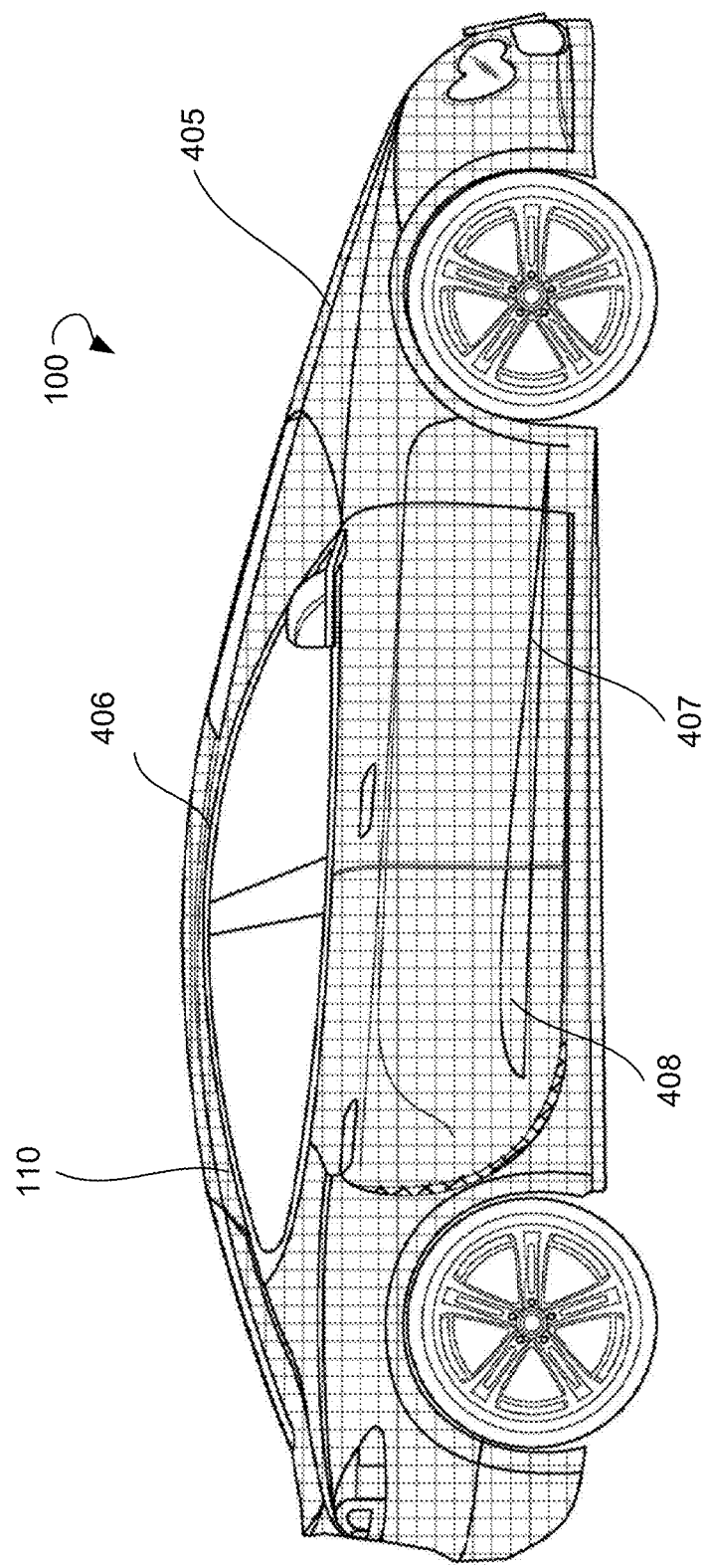
FIG. 42 is right side view of self-jet and solar cells powered electrical hybrid car of the present invention.
Figure 43:
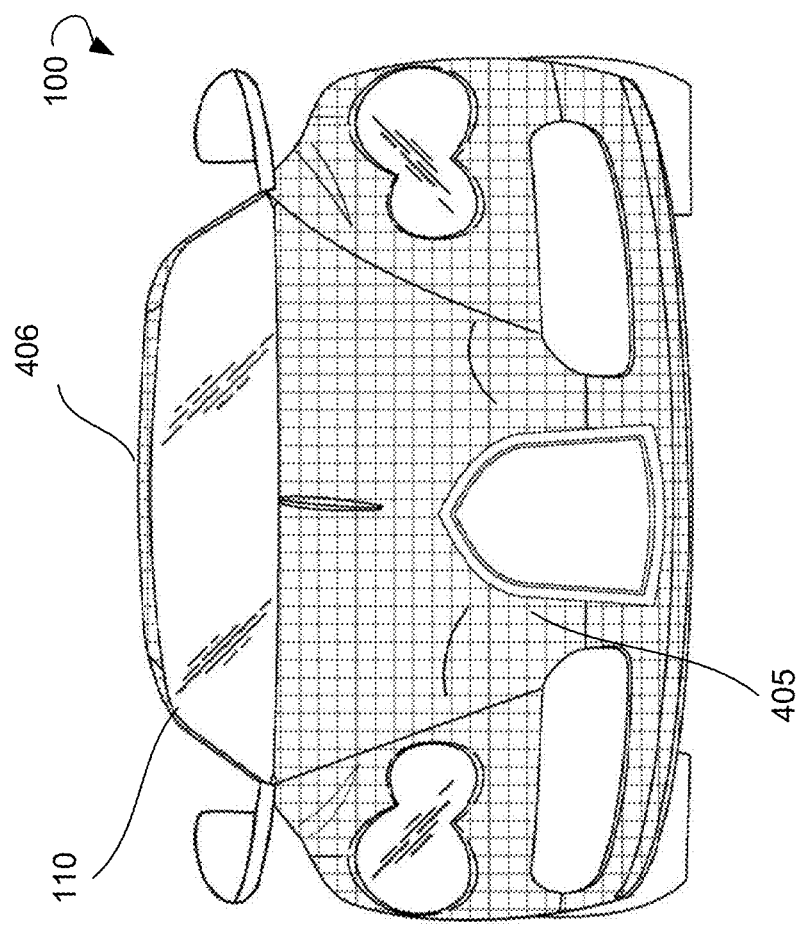
FIG. 43 is front view of self-jet and solar cells powered electrical hybrid car of the present invention.
Figure 44:
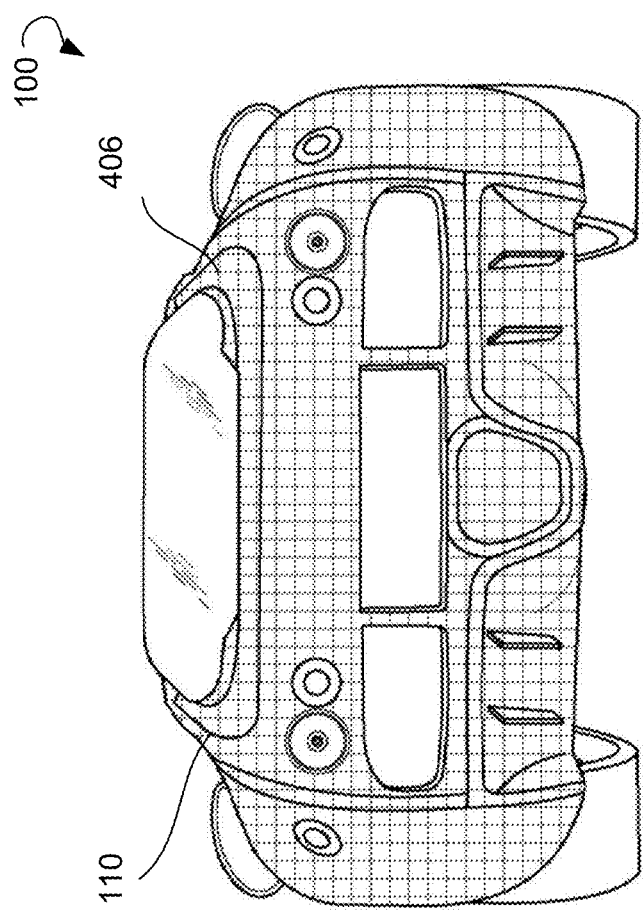
FIG. 44 is back view of self-jet and solar cells powered electrical hybrid car with two jet engine nozzles of the present invention.
Figure 45:
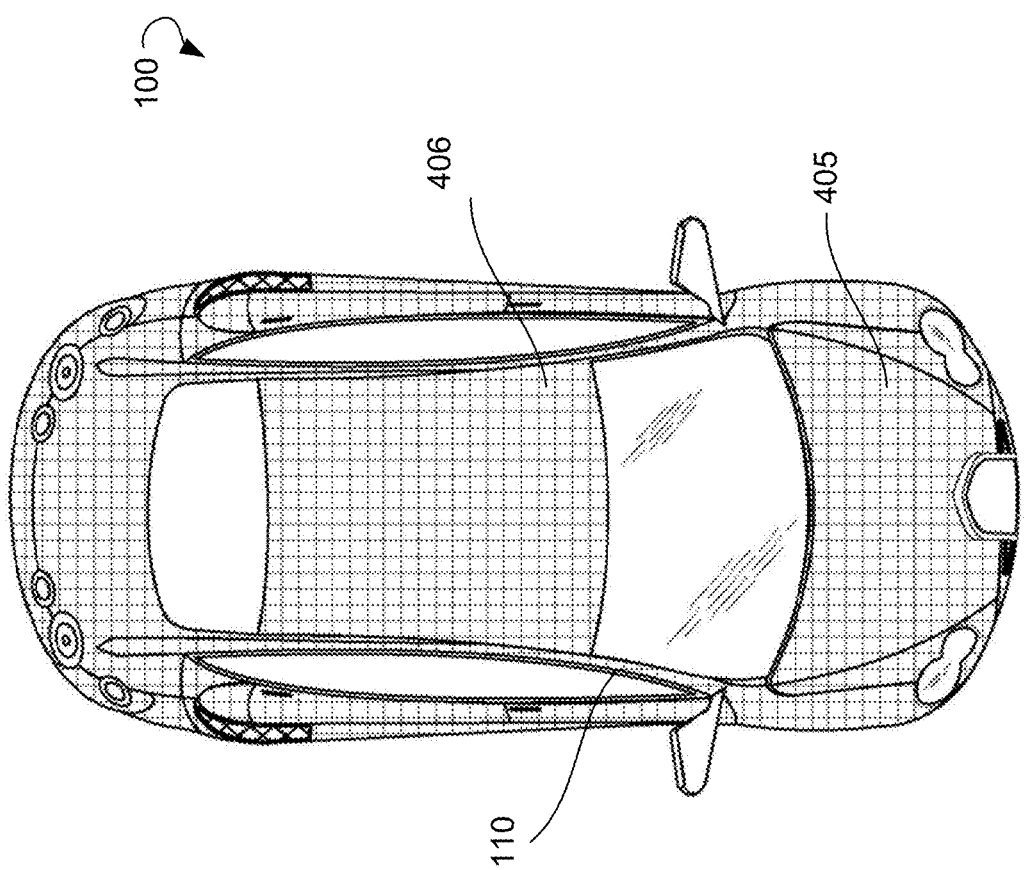
FIG. 45 is top view of self-jet and solar cells powered electrical hybrid car of the present invention.
Figure 46:
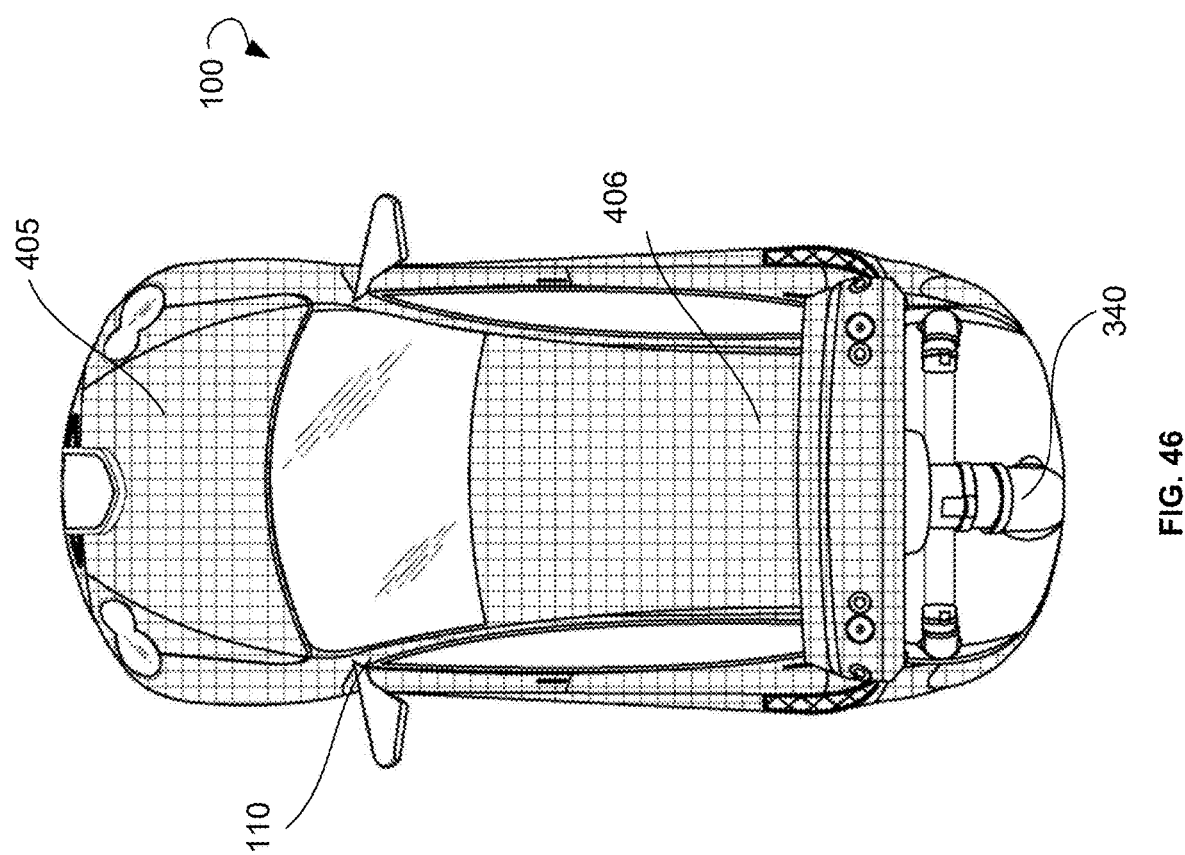
FIG. 46 is top back view of self-jet and solar cells powered electrical hybrid car showing folded main big jet engine nozzle and two side three bearing duct nozzles of the present invention.
Figure 47:
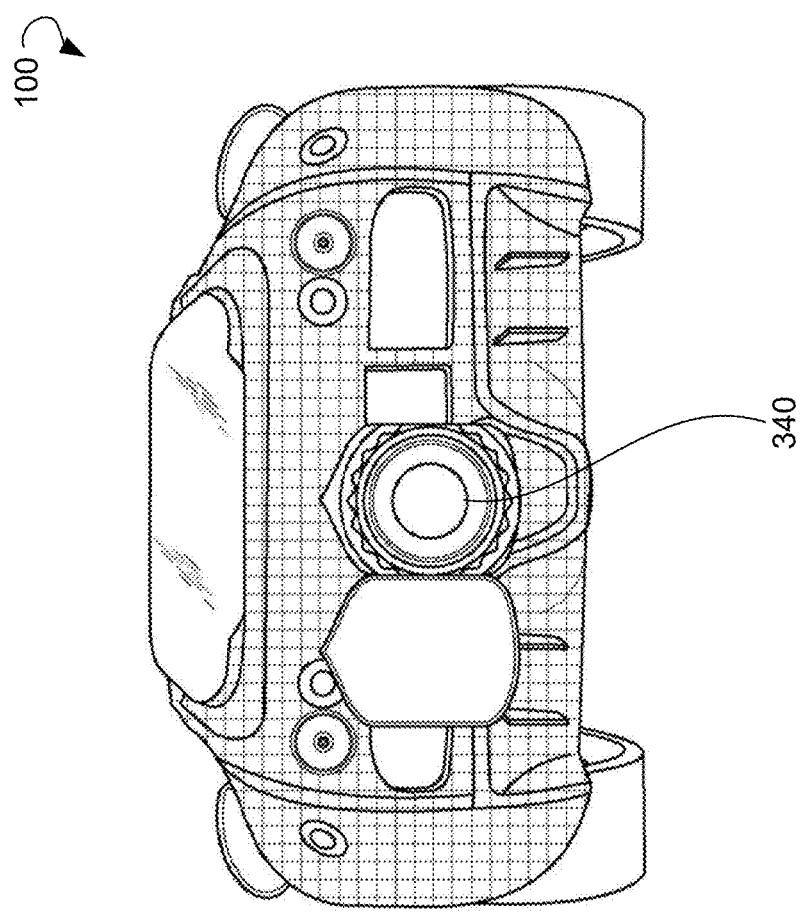
FIG. 47 is top back view of self-jet and solar cells powered electrical hybrid car showing the main jet engine nozzle for forward jet powered super speed driving of the present invention.
Figure 48:
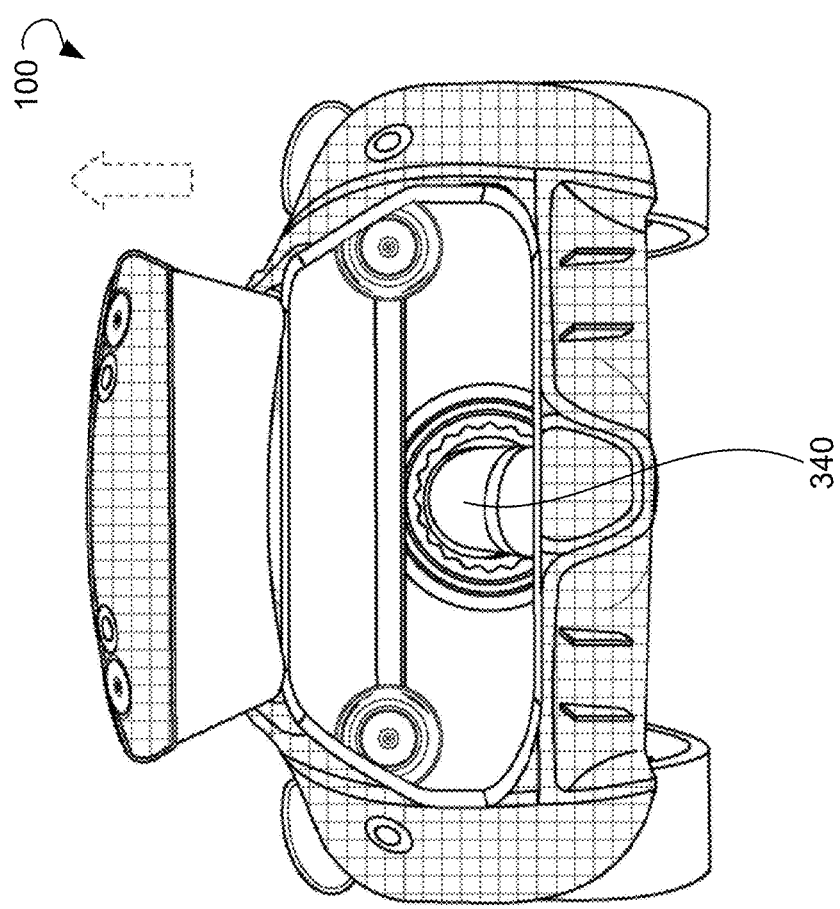
FIG. 48 is top back view of self-jet and solar cells powered electrical hybrid car showing two jet engine nozzles and one main jet engine folded bent down inside the trunk of the present invention.
Figure 49:
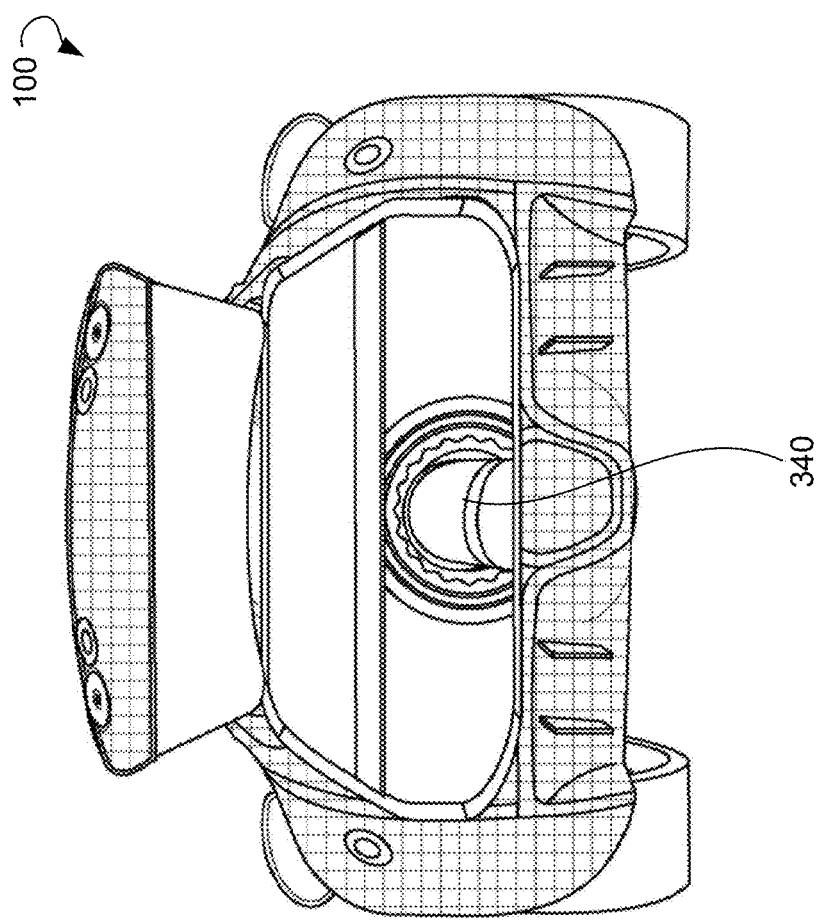
FIG. 49 is top back view of self-jet and solar cells powered electrical hybrid car showing the main jet engine nozzle bent down with three bearing swivel of the present invention.
Figure 50:
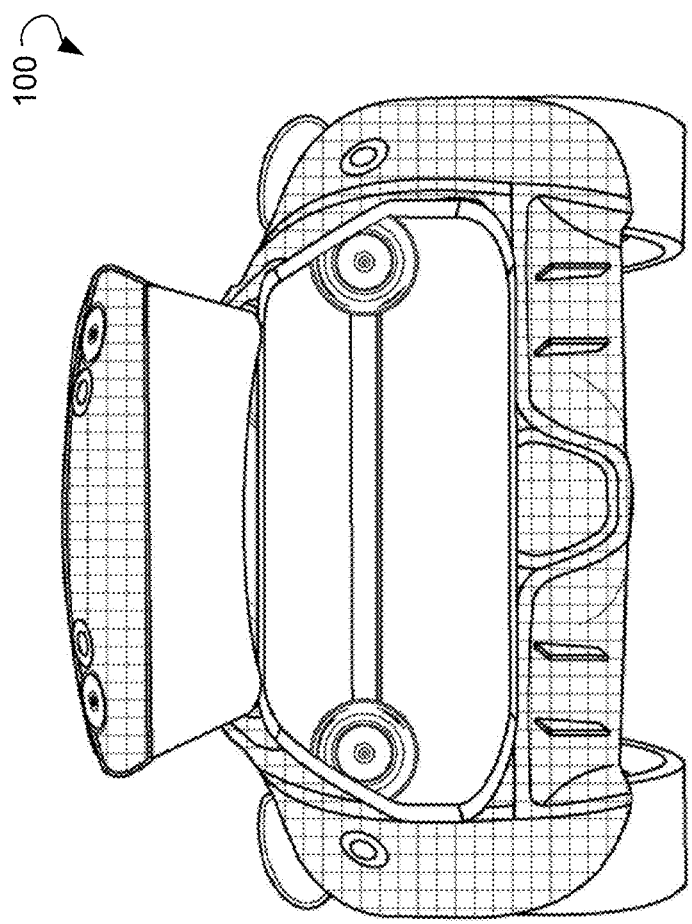
FIG. 50 is top back view of self-jet and solar cells powered electrical hybrid car showing dual jet engine nozzles of the present invention.

Further, a plurality of as jet engines 160 and ducted fans (such as a ducted fan 390 shown on FIG. 39) are adapted for driving the flying jet car 100 on surface as well as on flight. The plurality of foldable jet engines 160 are attached to either sides of the car, two jet engines 160 on front end of the flying jet car 100 and two jet engines 160 on rear end of the flying jet car 100. The plurality of jet engines 160 can also be swivelled in any desired direction to assist in lift, thrusting or during takeoff of the car. The corresponding FIGS. 15 to 18 show the different positions of jet engine 160 in a flying jet car 100, according to an embodiment of the present invention.

FIGS. 19 to 26 represents different views of an amphibious VTOL unmanned device 300 having the jet engines, according to an embodiment of the present invention. The jet engines include a turbojet engine 190. The turbojet engine 190 further comprises an afterburner, a rotating jet with hydraulic actuator rotation communicating with the engine fuel system having a line management electrohydraulic control converter mounted on the turbot engine 190, wherein the afterburners allow for powerful bursts of acceleration. The turbojet engine 190 further consists of at least one supercharger, the supercharger is adapted to increase the air density and the supercharger is adapted for charging batteries, the batteries are adapted to supply power to an auxiliary power unit, the jet powered hybrid automobile is adapted to generate power to a battery storage and producing thrust to increase torque.

The jet engine of the amphibious VTOL unmanned device may be a turbojet, a turbofan, a turboprop, a turboshaft, a ramjet, a scramjet. The jet engine 160 is adapted for short take off and vertical landing (STOVL), or the flying jet car 100 is adapted for vertical takeoff and landing (VTOL), or the flying jet car 100 is adapted for conventional take-off and landing (CTOL), or the flying jet car 100 is adapted for catapult assisted take-off but arrested recovery or catapult assisted take-off barrier arrested recovery (CATOBAR).

In an embodiment the jet engine 160 is a tiltjet, the tiltjets employs the jet engines 160, entire propulsion system being rotated from axial to dorsal to achieve a transition from hover or vertical flight to horizontal. In another embodiment, the jet engine 160 is a lift jet, the lift jet is a jet engine 160 angled to provide the flying jet car 100 with aerostatic lift instead of thrust.

During the lift, with power being transferred from each of the engines 160 to each of the lift fans of the lift fan drive systems through a single planetary gearbox, the plurality of turbine engines 160 are also used to power the forward thrust fan drive system through a secondary gearbox.

Furthermore, the flying jet car 100 is used as a thrust vector control to control the direction of the thrust generated by the turbine engines 160. The thrust vector control is controlled by a vectoring nozzle, the vectoring nozzle is controlled by the actuators. The thrust vector control is used to control the direction of thrust of the flying jet car 100, the thrust vector control is controlled by a gimbaled thrust system, the gimbaled thrust system controls a exhaust nozzle of the jet car, the jet car is swivelled from side to side, the nozzle is moved, the direction of the thrust is changed relative to the center of gravity of the jet car.

The thrust vector control of the flying jet car 100 further comprises plurality of bearing swivel module mechanism, wherein the bearing swivel module controls the thrust direction of the flying jet car 100, the bearing swivel module controls are adapted to move the flying jet car 100 in all the direction by changing the front bearing swivel module controls and by changing the rear bearing swivel module controls.

Figure 27:
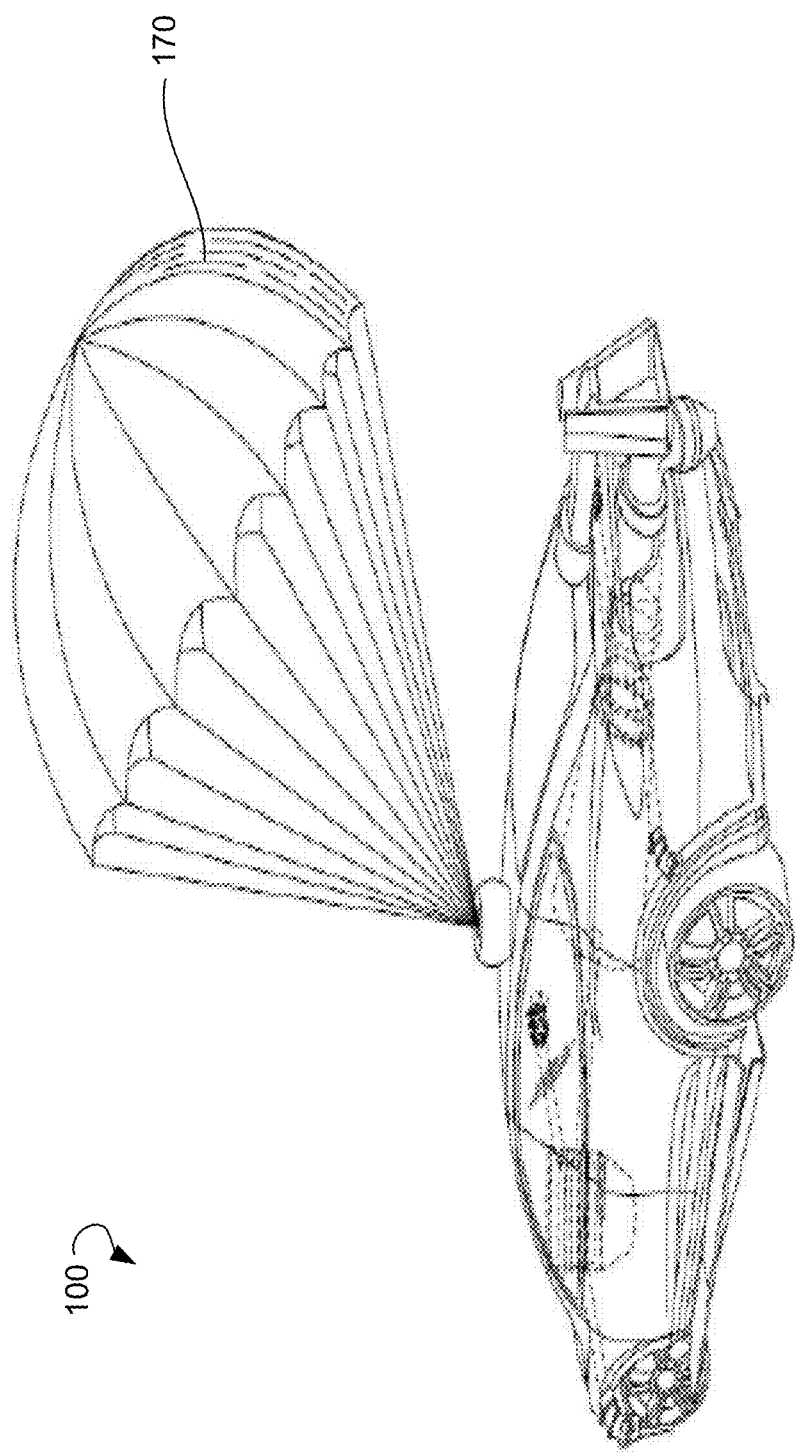
FIG. 27 is a close up of the isometric view of the flying jet car with embedded parachute, according to an embodiment of the present invention.
Figure 28:
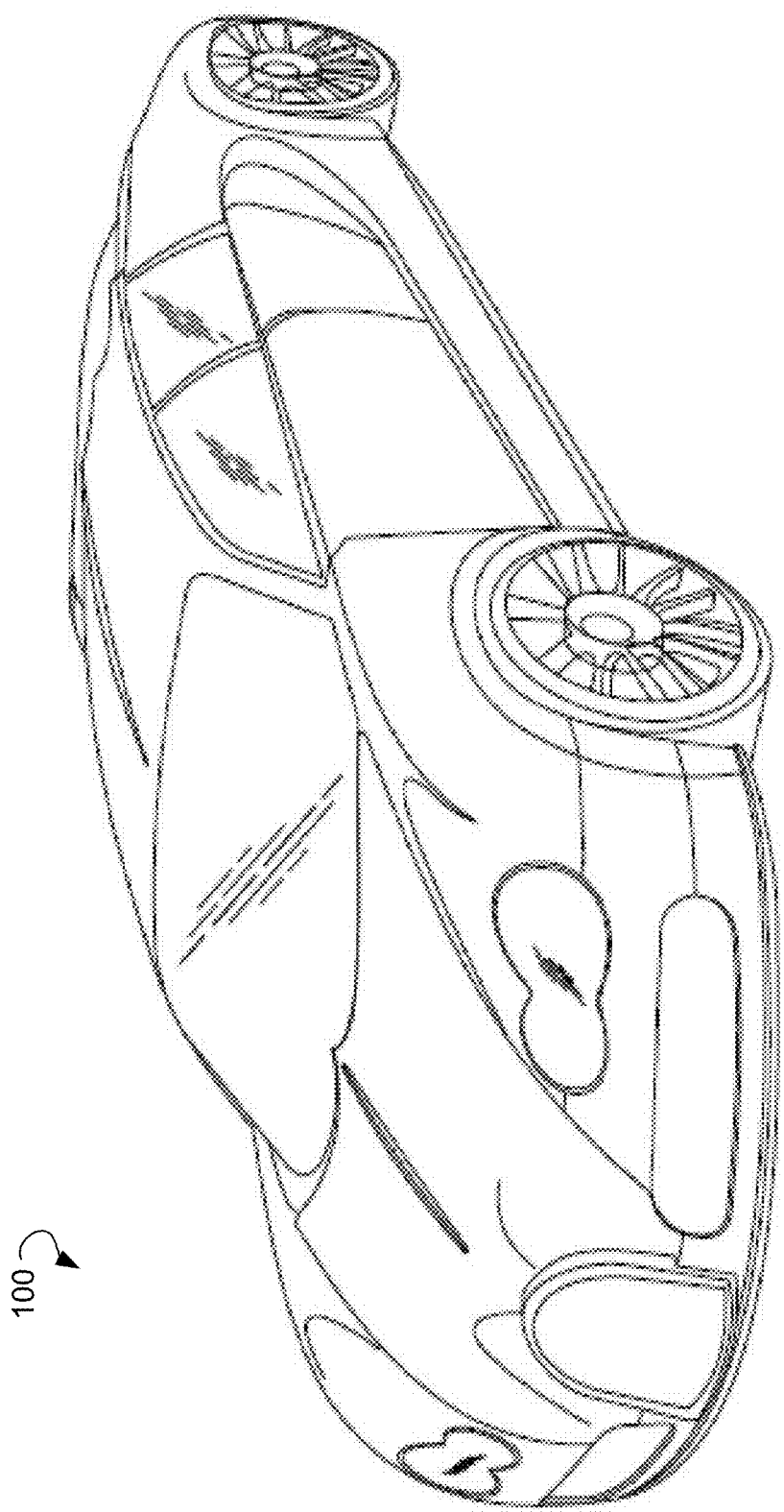
FIG. 28 is a close up of the isometric view of the flying jet car on road, according to an embodiment of the present invention.
Figure 29:
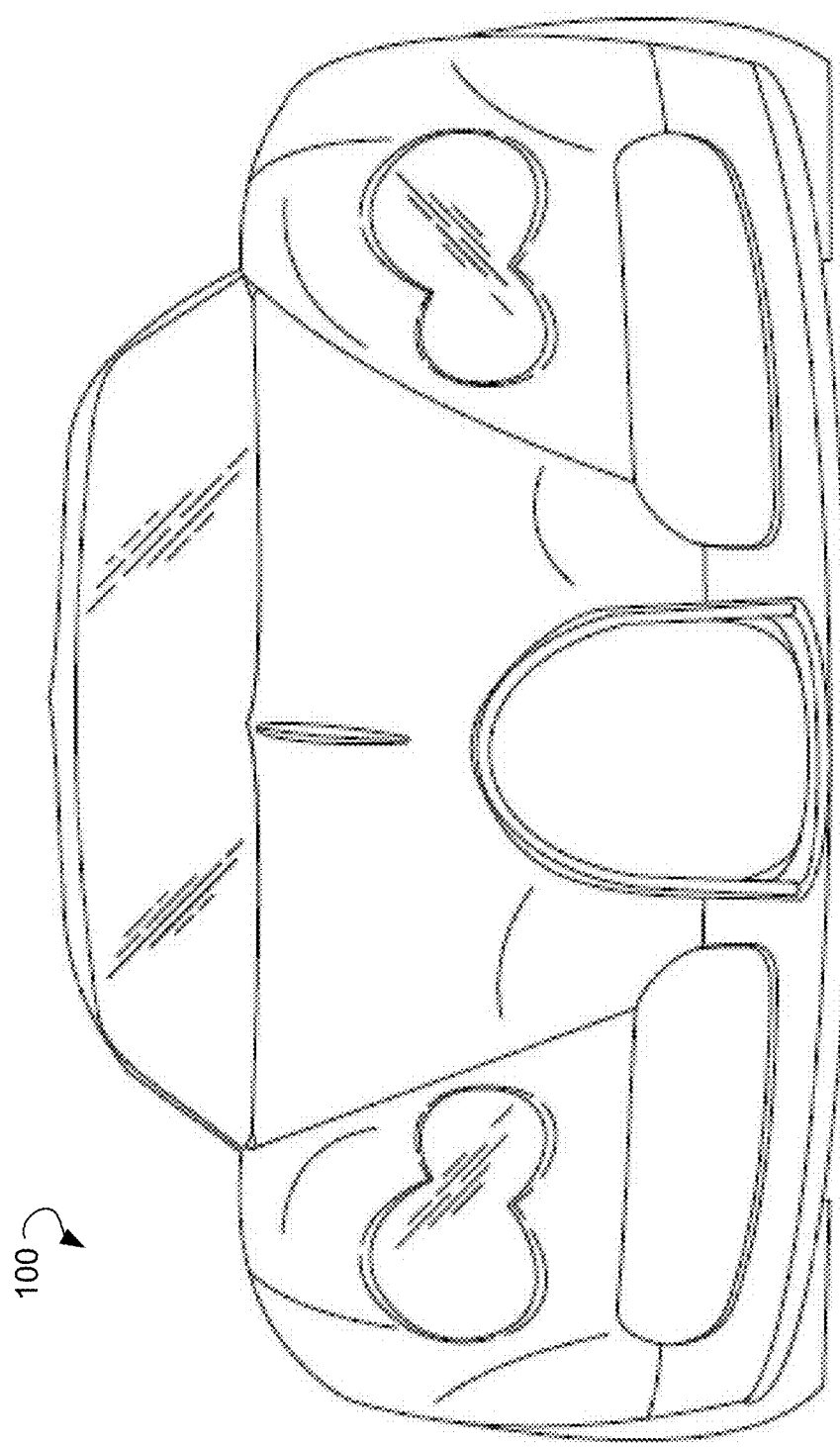
FIG. 29 is a close up of the front view of the flying jet car on road, according to an embodiment of the present invention.
Figure 30:
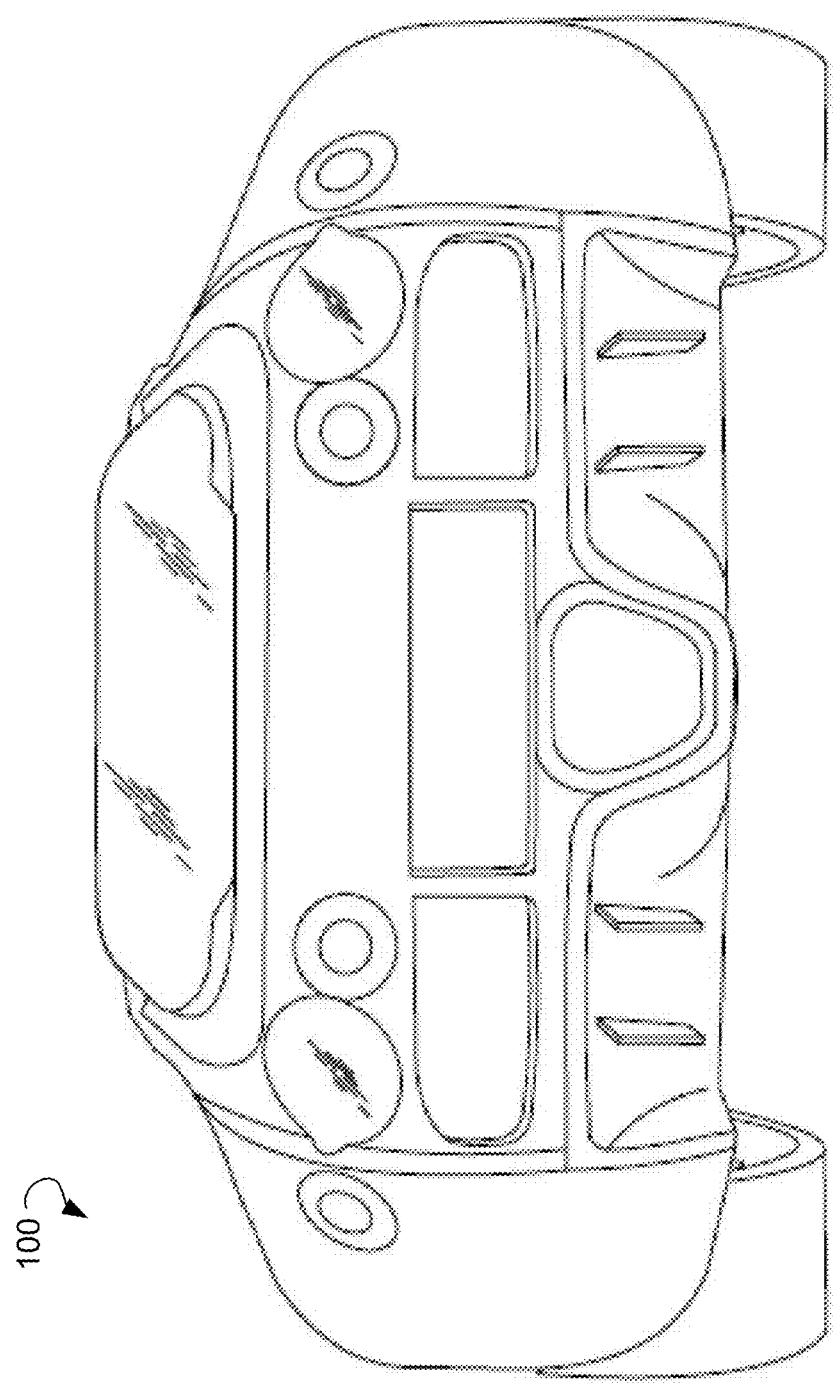
FIG. 30 is a close up of the rear view of the flying jet car on road, according to an embodiment of the present invention.
Figure 31:
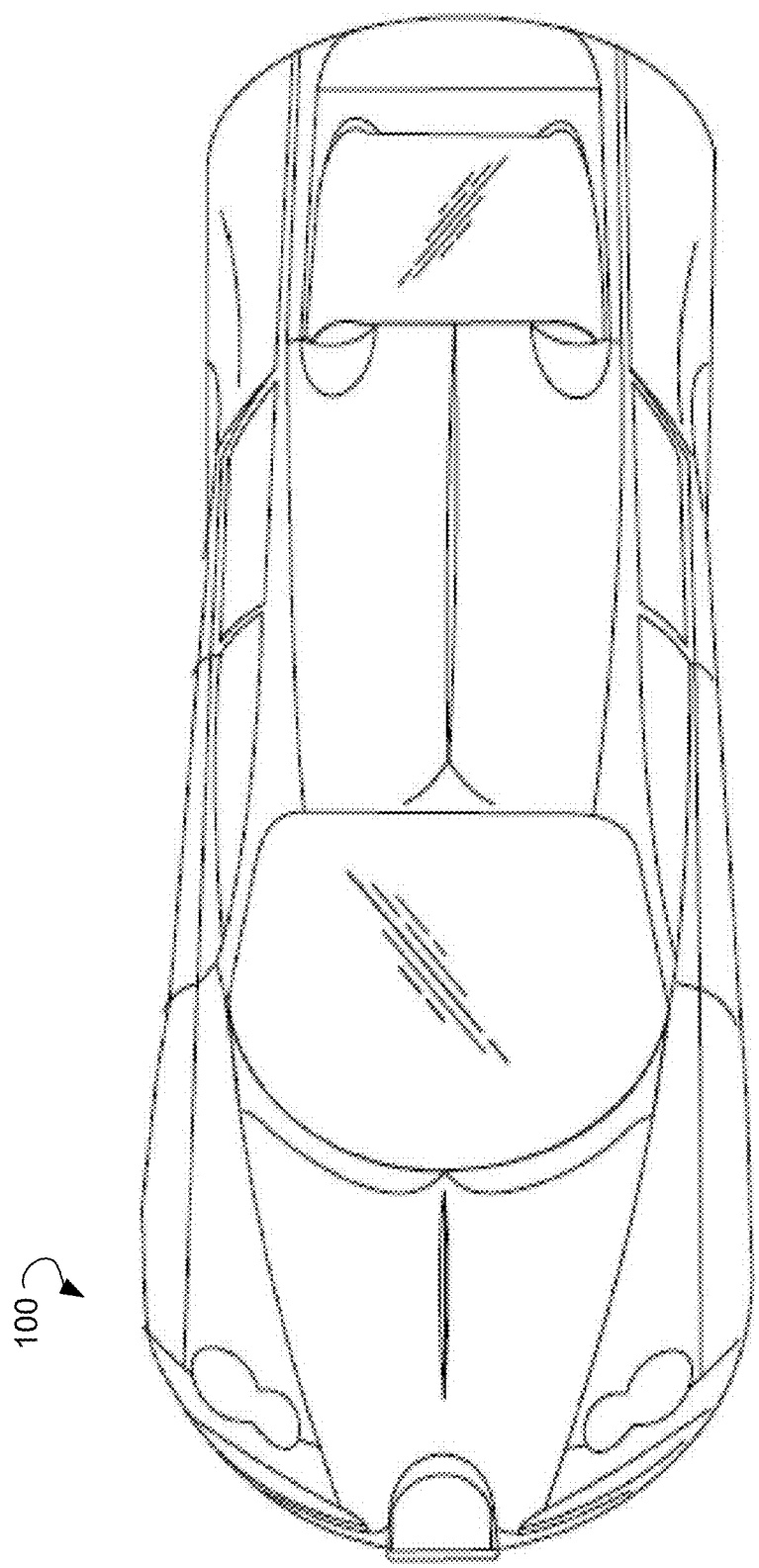
FIG. 31 is a close up of the top view of the flying jet car on road, according to an embodiment of the present invention.
Figure 32:
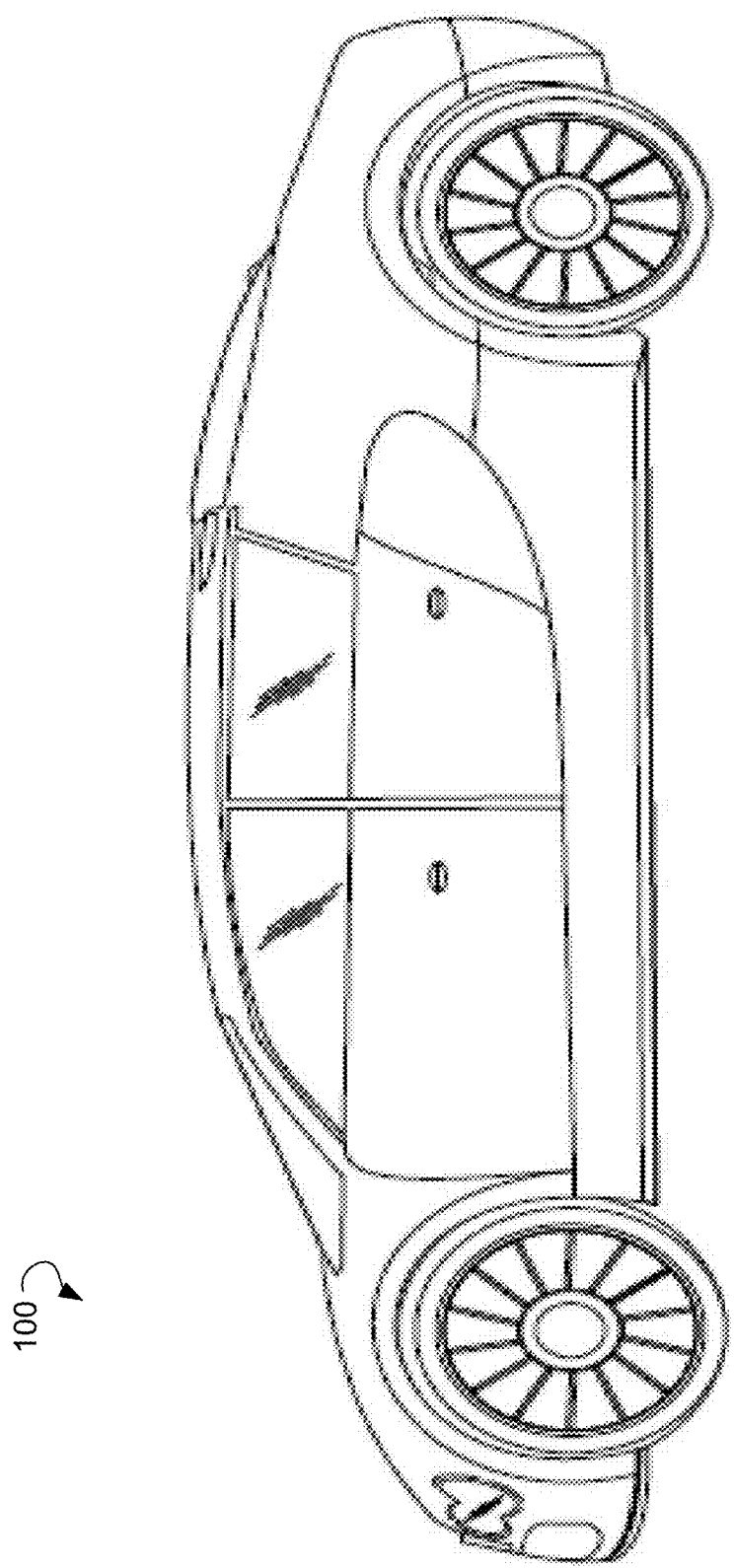
FIG. 32 is a close up of the left view of the flying jet car on road, according to an embodiment of the present invention.
Figure 33:
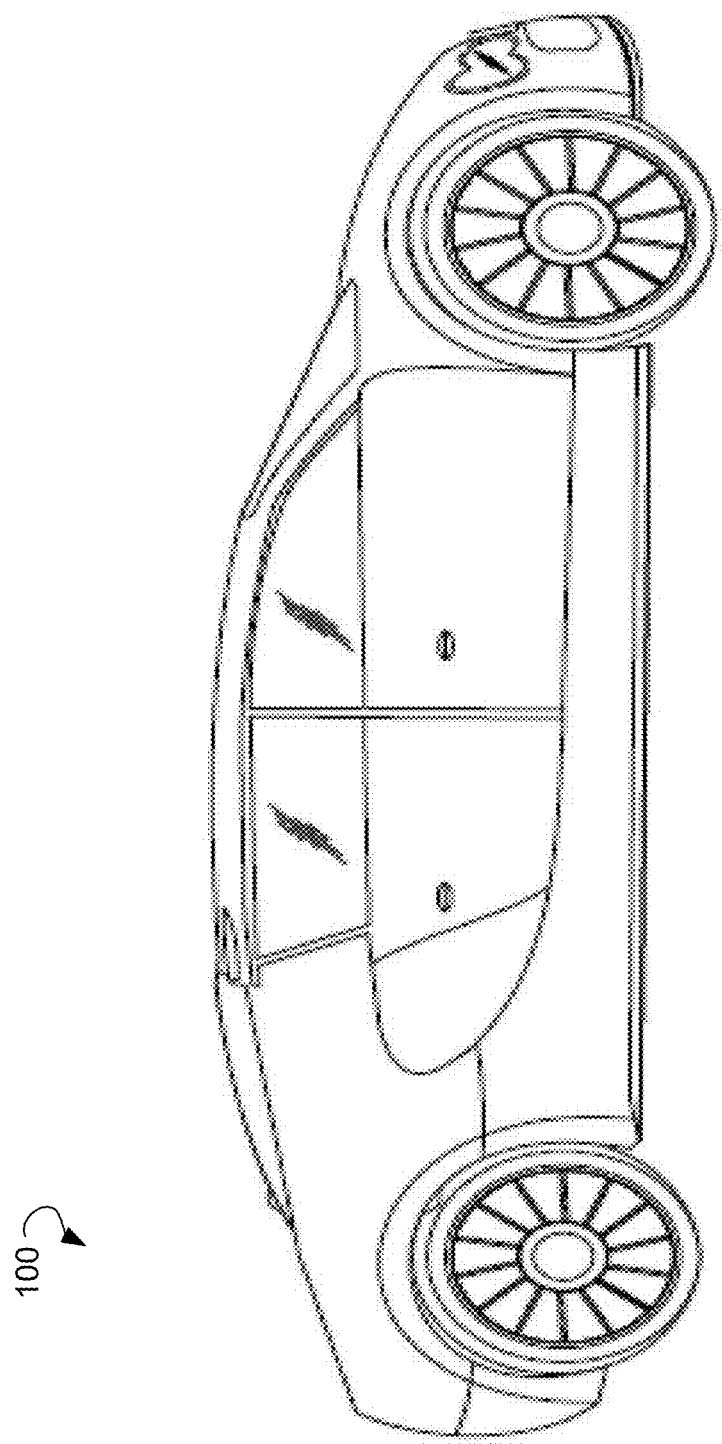
FIG. 33 is a close up of the right view of the flying jet car on road, according to an embodiment of the present invention.
Figure 34:
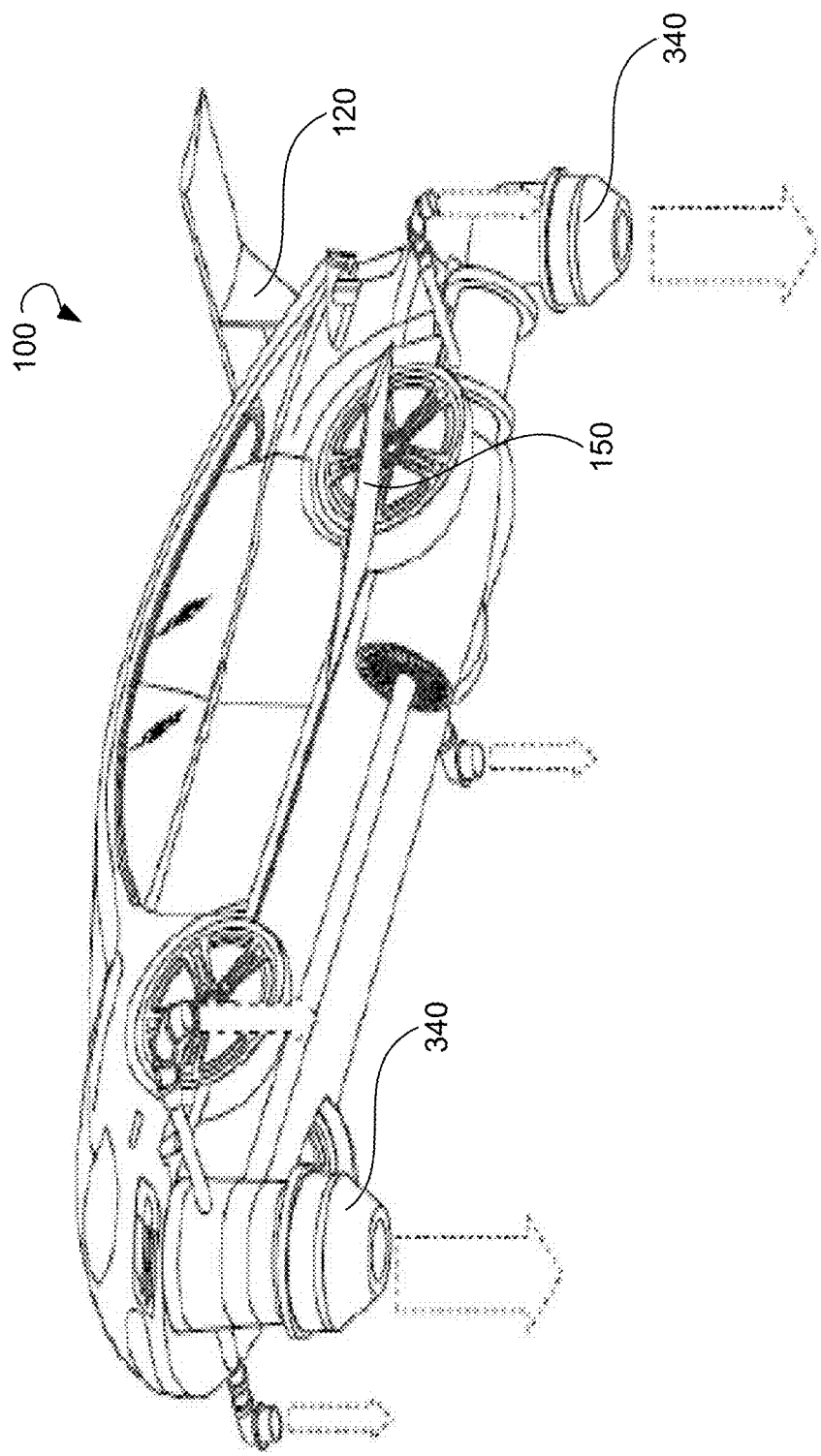
FIG. 34 is a close up of the isometric view of control of lift of jet flying car, according to an embodiment of the present invention.
Figure 35:
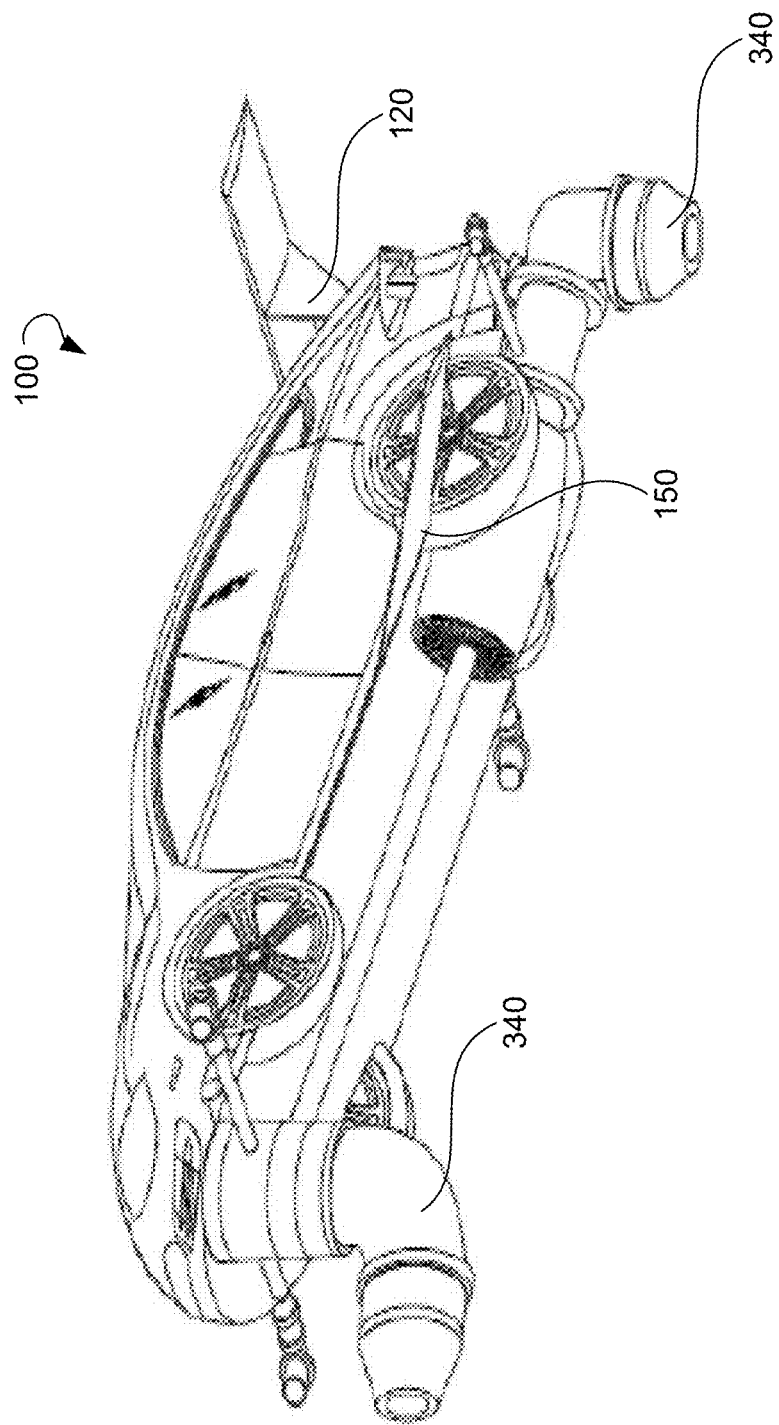
FIG. 35 is a close up of the isometric view of control of take off of jet flying car, according to an embodiment of the present invention.
Figure 36:
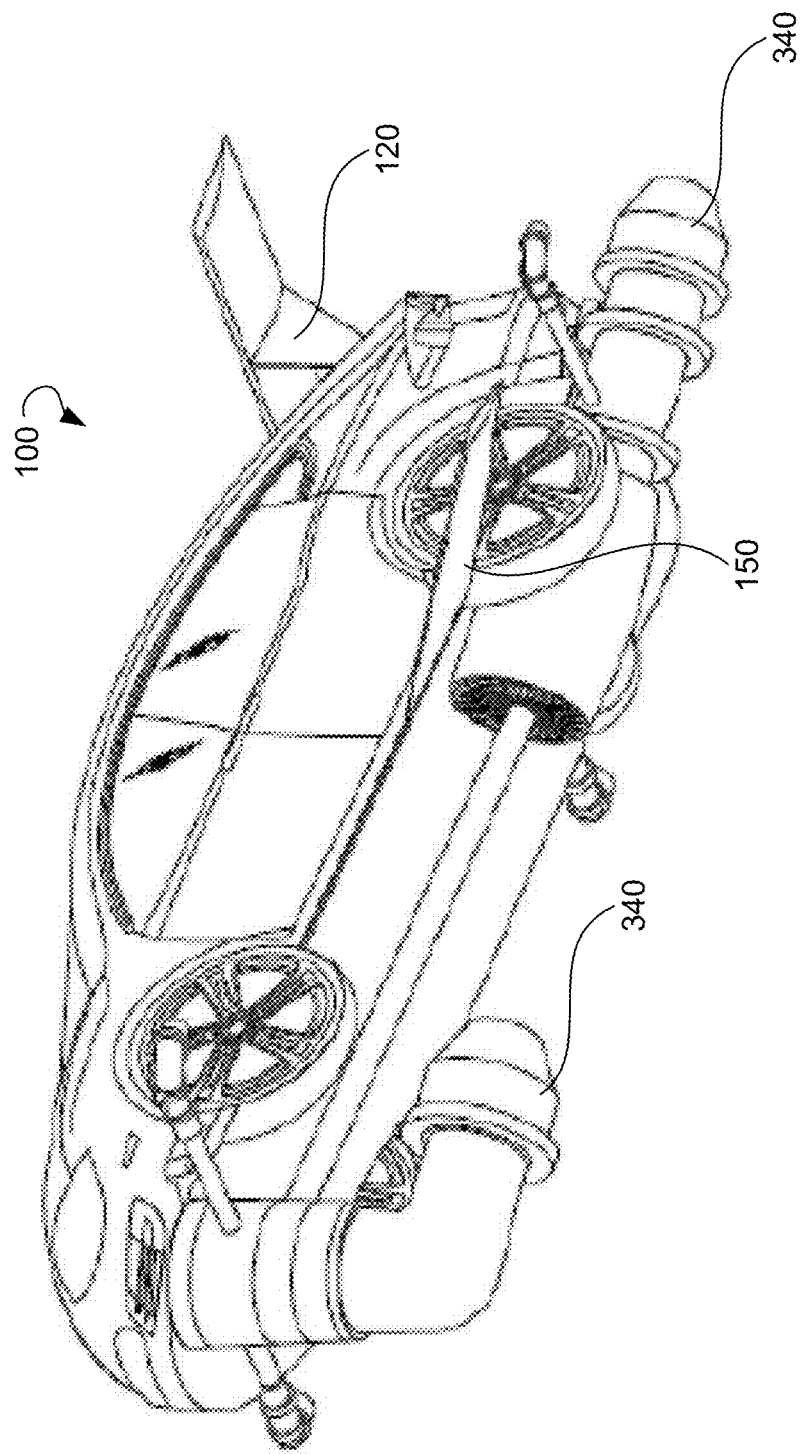
FIG. 36 is a close up of the isometric view of thrust control of jet flying car, according to an embodiment of the present invention.
Figure 37:
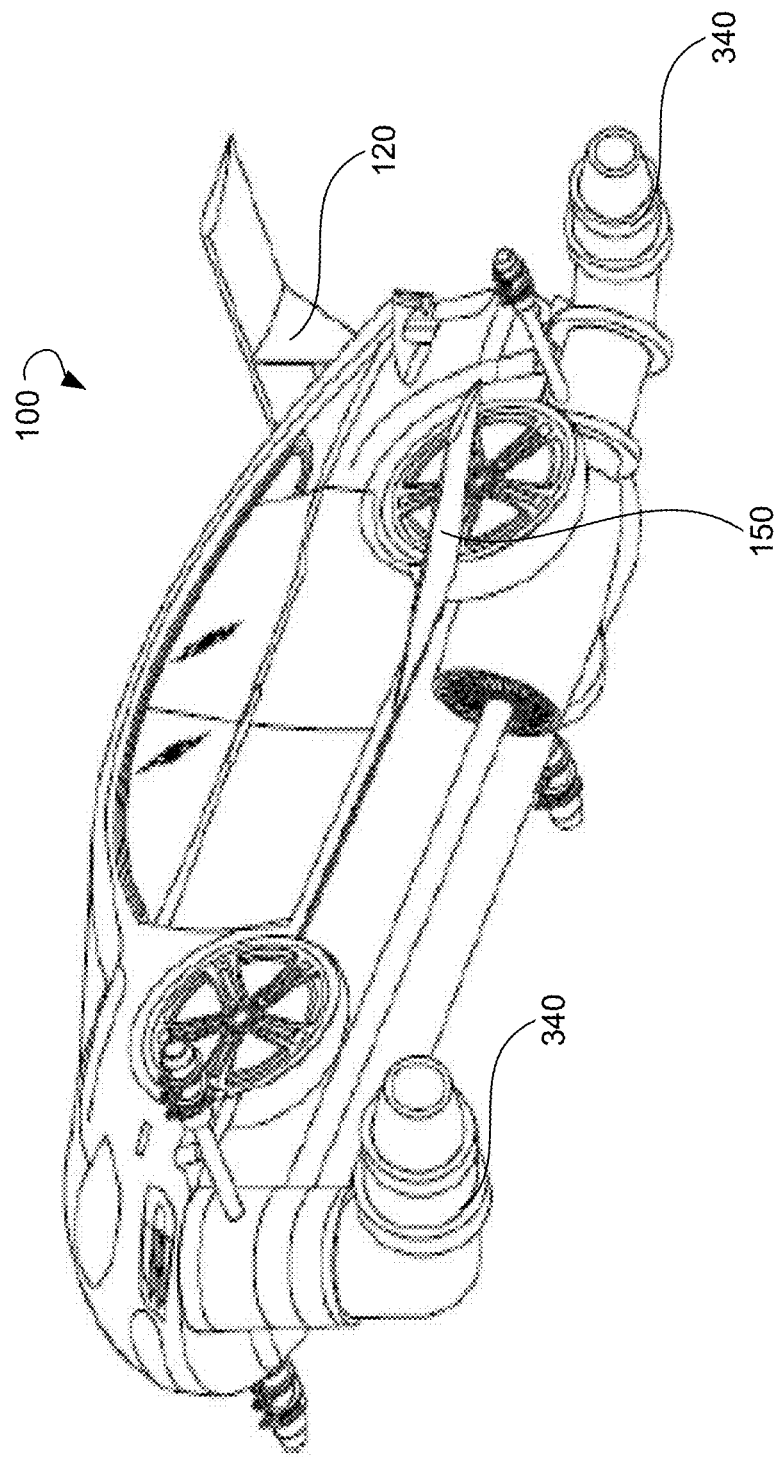
FIG. 37 is a close up of the isometric view of right movement control of jet flying car, according to an embodiment of the present invention.
Figure 38:
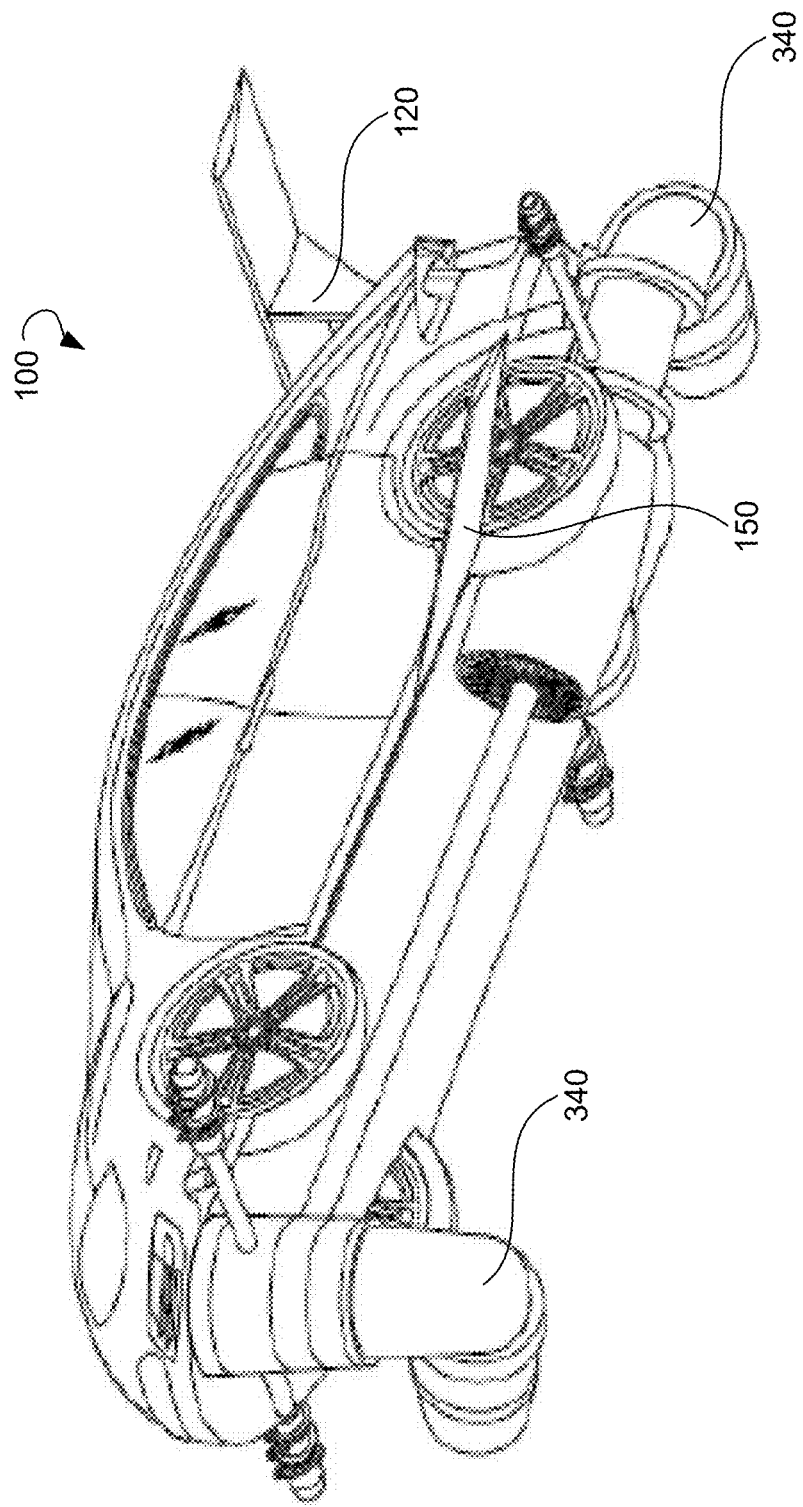
FIG. 38 is a close up of the isometric view of left movement control of jet flying car, according to an embodiment of the present invention.

Plurality of parachutes 170 are attached to the flying jet car 100 to safe land the flying jet car 100 under emergency, wherein a parachute 170 is fixed at the bottom of the flying jet car 100, two parachutes 170 on front and back of the flying jet car 100. The parachute 170 is a drogue type parachute 170, the drogue parachute 170 is adapted to rapidly move an object in order to slow the object. FIG. 27 is a close up of the isometric view of the flying jet car 100 with embedded parachute 170, according to an embodiment of the present invention.

Apart from the aforesaid features, the flying jet car 100 also consists of a cockpit adapted for displaying the flight conditions on the display, a cockpit speech recognition, a seat ejection system adapted for ejecting the seat during emergency, collision avoiding system etc. Further flying jet car 100 has a stability system having a plurality of inputs, including that of a pilot, and a plurality of actuating outputs, wherein one of the actuating outputs is to control the angular pitch tiltjet, with the change in pitch of the tiltjet varies the vertical thrust provided by each jet, wherein the stabilizer arrangement includes canards.

The additional features of the flying jet car 100 includes solar panels 405, 406, 407, and 408 as shown on FIG. 39 to FIG. 50, wherein the solar panels 405, 406, 407, and 408 are fixed on the top of the wings 150, body 110, the solar panels 405, 406, 407, and 408 are chrome plated, the solar panels 405, 406, 407, and 408 give an electric charge to batteries, for power to generators, the solar panels 405, 406, 407, and 408 supply energy to an auxiliary power unit (APU).

The flying jet car 100 further consists of capturing of the flight and environmental conditions by plurality of cameras, the cameras are adapted for surveillance. And also flying jet car 100 comprises of a slow landing system, to assist the flying jet car 100 land slowly and steadily.

Adding to all, the flying jet car 100 further consists of at least one two way telemetry device, a broad cast device, a collision avoidance system, a processor, a navigation device, and plurality of sensors (not shown). The flying jet car 100 further includes electronic speed controllers, a video transmitter, one or more antennas, a radio control receiver, and a power distribution board. The processor may be configured to control at least vectoring of a gimbaled swivel propulsion (GSP) thrust associated with a GSP system to control a direction of a thrust generated by the plurality of VTOL jet engines. The electronic speed controllers are selected from a standalone electronic speed controller and an electronic speed controller integrated into the power distribution board. The flying jet car 100 further includes printed parts selected from 3-dimensional (3D) printed parts and 4-dimensional (4D) printed parts.

The one way and two way telemetry device is configured to control an on screen display to inform a user of battery voltage, current draw, signal strength, minutes flown, minutes left on battery, joystick display, flight and dive mode and profile, amperage draw per unit of time, GPS latitude and longitude coordinates, an operator position relative to a position of the flying jet car 100, number of GPS satellites, and artificial horizon displayed on a wearable device, the wearable device being selected from a tablet, a phone, and the headset, wherein the one way and two way telemetry device is configured to provide a follow-me mode when the flying jet car 100 uses the wearable device as a virtual tether to track the user via the camera when the user moves, wherein the live broadcast device comprises an onboard High Definition Multimedia Input port operable to transmit standard definition, high definition, virtual reality, and interactive video to one or more bystanders, wherein the interactive video is broadcasted on at least one of the following: a screen, a projector, a split screen, a switch screen, and the headset, wherein the live broadcast device further comprises an aerial, ground, and marine vehicle for filming the flying jet car 100.

The processor includes a flight controller, wherein the flight controller is selected from an external micro controller or an internal micro controller and a barometer, an accelerometer, a gyroscope a GPS and a magnetometer.

The navigation device is configured to enable autonomous flying at low altitude and avoiding obstacles; evaluate and select landing sites in an unmapped terrain; land safely using a computerized self-generated approach path; enable a pilot aid to help a pilot to avoid obstacles and select landing sites in unimproved areas during operating in low-light or low-visibility conditions; detect and manoeuvre around a man lift during flying; detect high-tension wires over a desert terrain; and enable operation in a near earth obstacle rich environment; and a navigation sensor configured to: map an unknown area where obstructions limited landing sites; identify level landing sites with approach paths that are accessible for evacuating a simulated casualty; build three-dimensional maps of a ground and find obstacles in a path; detect four-inch-high pallets, chain link fences, vegetation, people and objects that block a landing site; enable continuously identifying potential landing sites and develop landing approaches and abort paths; select a safe landing site being closest to a given set of coordinates; wherein the navigation sensor includes an inertial sensor and a laser scanner configured to look forward and down, wherein the navigation sensor is paired with mapping and obstacle avoidance software, the mapping and obstacle avoidance software being operable to keep a running rank of the landing sites, approaches and abort paths to enable responding to unexpected circumstances, wherein the system includes an open source code and an open source software development kit, wherein the one or more sensors are selected from a group comprising: individual sensors, stereo sensors, ultrasonic sensors, infrared sensors, multispectral sensors, optical flow sensors, and volatile organic compound sensors, wherein the one or more sensors are provided for intelligent positioning, collision avoidance, media capturing, surveillance, and monitoring.

FIGS. 28 to 33 and FIGS. 34 to 38 represents operation of the flying jet car 100 on road and on air respectively. In an embodiment of the present invention the flying jet car 100 can be operated on road as well as on air. On road the jet engine 160 generates the power which propels the car to move, whereas during flight mode foldable wings 150 are open and various mechanisms are involved to fly the car, the control mechanisms involved during transferring the payload from once place to another are stabilizing the flying jet car 100 obtained from a tail 120, wherein the stabilizing of flying jet car 100 is obtained by a wing tail and at least one horizontal stabilizers, pitching of a tilt jet according to the required lift. Tilting arrangement is adapted for titling the tilting engines 340. The folding or unfolding is adapted for folding or unfolding of the wing of the flying jet car 100 based on the flight requirement. Thrust vectoring is controlled by a thrust control mechanism, wherein the thrust vectoring is controlled by a three bearing swivel module, wherein the three bearing swivel module controls the thrust direction of the flying jet car 100, the bearing swivel module is adapted to move the flying jet car 100 in all directions by changing the front bearing swivel module controls and by changing the rear bearing swivel module controls.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

While various embodiments have been shown and described, it will be understood that there is no intent to limit the invention by such disclosure, but rather, it is intended to cover all modifications and alternate constructions falling within the scope of the invention, as defined in the appended claims.

What is claimed is:

1. An amphibious vertical takeoff and landing (VTOL) unmanned device with an artificial intelligence (AI) data processing mobile and wearable apparatus, the amphibious VTOL unmanned device comprising:
   a modular and expandable waterproof body adapted for carrying a payload;
   an outer body shell associated with the modular and expandable waterproof body and comprising one or more pieces;
   a gimbaled swivel propulsion (GSP) system, the GSP system comprising a plurality of VTOL jet engines and VTOL ducted fans associated with a plurality of motors, wherein the plurality of VTOL jet engines are selected from turbojet engines, turbofan engines, and foldable variable pitch tilting engines, wherein the VTOL ducted fans include at least a multi-blade ducted fan, the plurality of VTOL jet engines being adapted for driving the amphibious VTOL unmanned device on a surface and in a flight, wherein the turbojet engines comprise afterburners configured to rotate a fuel jet with hydraulic actuator rotation and communicating with an engine fuel system of the amphibious VTOL unmanned device, the engine fuel system having a line management electro-hydraulic control converter mounted on the turbojet engines, wherein the afterburners allow for bursts of acceleration of the fuel jet;
   a processor, electronic speed controllers, a two-way telemetry device, a video transmitter, a radio control receiver, and a power distribution board, the processor being configured for controlling at least vectoring of a GSP thrust associated with the GSP system to control a direction of a thrust generated by the plurality of VTOL jet engines, wherein the electronic speed controllers are selected from a standalone electronic speed controller and an electronic speed controller integrated into the power distribution board;
   an electrical machine comprising a stator electrically connected to an electrical power storage device, wherein the electrical machine acts as an electric motor for driving rotation of the plurality of VTOL jet engines by using the electrical power storage device, and wherein the electrical machine with the plurality of VTOL jet engines act as an electrical power generator for re-charging the electrical power storage device;
   an onboard electricity generator comprising a plurality of solar cells, wherein the onboard electricity generator includes carbon fiber hybrid solar cells;
   printed parts selected from 3D printed parts and 4D printed parts;
   a light detection and ranging (LIDAR) device, an ultrasonic radar sensor, and a plurality of sensors;
   a tail attached to the modular and expandable waterproof body at a rear end and adapted for stabilizing the amphibious VTOL unmanned device;
   a head VTOL ducted fan attached to the modular and expandable waterproof body at a front end and adapted for VTOL;
   a plurality of wheels at a bottom of the amphibious VTOL unmanned device connected to the power distribution board;
   a plurality of foldable wings on sides of the modular and expandable waterproof body, the plurality of foldable wings being adapted for creating a pressure difference and creating a lift associated with the amphibious VTOL unmanned device; and
   a plurality of parachutes attached to the amphibious VTOL unmanned device to safely land the amphibious VTOL unmanned device in an emergency, wherein at least one parachute of the plurality of parachutes is fixed to each of: the bottom of the amphibious VTOL unmanned device, the front end of the amphibious VTOL unmanned device, and the rear end of the amphibious VTOL unmanned device.

2. The amphibious VTOL unmanned device of claim 1, further comprising a plurality of doors, a windshield, a dashboard, and a tail wing.

3. The amphibious VTOL unmanned device of claim 2, wherein the stabilizing of the amphibious VTOL unmanned device is obtained by the tail wing and at least one horizontal stabilizer.

4. The amphibious VTOL unmanned device of claim 1, wherein the foldable variable pitch tilting engines of the plurality of VTOL jet engines are attached to sides of the modular and expandable waterproof body, and wherein two of the plurality of VTOL jet engines are attached to a front end of the modular and expandable waterproof body, and wherein further two of the plurality of VTOL jet engines are attached to the rear end of the modular and expandable waterproof body.

5. The amphibious VTOL unmanned device of claim 1, further comprising batteries and at least one supercharger, wherein the at least one supercharger is adapted to increase air density, and wherein the at least one supercharger is adapted for charging the batteries, wherein the batteries are adapted to supply power to an auxiliary power unit.

6. The amphibious VTOL unmanned device of claim 5, wherein the batteries are partially or completely modular batteries, and wherein the electronic speed controllers are configured to detach from an electronic speed controller stack, the video transmitter and the radio control receiver are removable for upgrading, the two-way telemetry device is removable for upgrading, the plurality of motors are removable for upgrading, and the processor is configured to detach from the power distribution board, wherein the batteries include a lithium ion polymer battery that conforms to an interior profile of the modular and expandable waterproof body and includes a built-in battery charge indicator.

7. The amphibious VTOL unmanned device of claim 5, wherein the two-way telemetry device is configured to control an on screen display of the AI data processing mobile and wearable apparatus to inform a user about a battery voltage of the batteries, a current draw, a signal strength, minutes flown, minutes of operation left for the batteries, a flight and dive mode and profile, an amperage draw per unit of time, GPS latitude and longitude coordinates, an operator position relative to a position of the amphibious VTOL unmanned device, number of GPS satellites, and artificial horizon displayed on the AI data processing mobile and wearable apparatus, the AI data processing mobile and wearable apparatus being selected from a tablet, a phone, and a headset, wherein the two way telemetry device is configured to provide a follow-me mode when the amphibious VTOL unmanned device uses the AI data processing mobile and wearable apparatus as a virtual tether to track the user via one or more cameras when the user moves.

8. The amphibious VTOL unmanned device of claim 1, further comprising one or more modules attached to the modular and expandable waterproof body, the one or more modules are selected from a group comprising: a waterproof battery module, a camera stabilization device, a thermal inspection device, an environmental sample processor, a seismometer, a spectrometer, an osmosampler, and a night vision device, and wherein the plurality of VTOL jet engines include a turbine engine.

9. The amphibious VTOL unmanned device of claim 8, wherein the turbine engine is configured to transfer power to each of VTOL ducted fans of a lift fan drive system through a single planetary gearbox.

10. The amphibious VTOL unmanned device of claim 1, wherein the modular and expandable waterproof body has a back portion and a front portion, wherein the back portion and the front portion show colors, wherein the device is configured to be launched from a body of a user, wherein the amphibious VTOL unmanned device is controlled by the user using the AI data processing mobile and wearable apparatus via motion gestures, buttons, and a touch screen of the AI data processing mobile and wearable apparatus, wherein the amphibious VTOL unmanned device is operable to perform an automatic landing and an automatic takeoff, wherein the amphibious VTOL unmanned device is configured in a form of one of the following: a people-carrying vehicle, a cargo-carrying vehicle, a radio controlled toy, an autonomous vehicle, a multi-blade ducted fan roadable electric aircraft, an uncrewed vehicle, a driverless car, a self-driving car, an unmanned aerial vehicle, a drone, a robotic car, a commercial goods and passenger carrying vehicle, and a private self-drive vehicle;
  wherein the autonomous vehicle is configured to sense environmental conditions, navigate without a human input, and perform auto-piloting, wherein the sensing is performed via the plurality of sensors, the plurality of sensors including, one or more of the following: a radar, a Global Positioning System (GPS) module, and a computer vision module; wherein the processor is operable to interpret sensory information to identify navigation paths, obstacles and signage; wherein the autonomous vehicle is configured to update maps based on a sensory input to keep track of a position of the amphibious VTOL unmanned device when conditions change or when the amphibious VTOL unmanned device enters uncharted environments;
  wherein the multi-blade ducted fan roadable electric aircraft is propelled by one or more electric motors of the plurality of motors using electrical energy stored in the electrical power storage device; and
  wherein the AI data processing mobile and wearable apparatus enables the user to submit a trip request, the trip request being routed to the amphibious VTOL unmanned device to initiate a peer-to-peer pick up service or a cargo transportation.

11. The amphibious VTOL unmanned device of claim 1, wherein the GSP system is powered by:
  a high pressure gas; and wherein the VTOL ducted fans are attached directly to a motor shaft associated with one or more of the plurality of motors or are mechanically linked to the one or more of the plurality of motors through a series of pulley belts.

12. The amphibious VTOL unmanned device of claim 1, further comprising a collision avoidance, flight stabilization, and multi-rotor control system, the collision avoidance, flight stabilization, and multi-rotor control system comprising:
  a flight and dive control device configured to perform one or more of the following: auto level control, altitude hold, return to an operator automatically, return to the operator by manual input, operating an auto-recognition camera, monitoring a circular path around a pilot, and controlling autopilot;
  one or more further sensors and one or more cameras configured to control one or more of the following: obstacle avoidance, terrain and Geographical Information System mapping, close proximity flight including terrain tracing, and crash resistant indoor navigation, an autonomous takeoff, an auto-fly or dive to a destination with at least one manually or automatically generated flight plan, an auto-fly or dive to the destination by tracking monuments, a direction lock, a dual operator control;
  a transmitter and receiver control device comprising one or more antennas, the one or more antennas including high gain antennas;
  the transmitter and receiver control device further comprising a lock mechanism operated by one or more of the following: numerical passwords, word passwords, fingerprint recognition, face recognition, eye recognition, and a physical key.

13. The amphibious VTOL unmanned device of claim 12, wherein the flight and dive control device is configured to:
  perform stable transitions between a hover mode, a full forward flight mode, and an underwater mode;
  enable or disable a GPS;
  record flight parameters;
  allow inverted flight, aerial and aquatic rolls and flips;
  stabilize proportional, integral, and derivative gains above water and below water;
  restrict the amphibious VTOL unmanned device to fly-safe locations;
  receive and enact force shut-off commands associated with a manufacturer;
  receive software updates from the manufacturer;
  activate the amphibious VTOL unmanned device after a user provides an input;
  provide thrust compensation for body inclination of the modular and expandable waterproof body by acting as a body pitch suppressor of the modular and expandable waterproof body to maintain an altitude in a forward flight; and
  compensate yaw and roll mixing when rotors of the amphibious VTOL unmanned device tilt.

14. The amphibious VTOL unmanned device of claim 1, further comprising:
  a navigation device configured to:
    enable autonomous flying at low altitude and avoiding obstacles;
    evaluate and select landing sites in an unmapped terrain;
    land safely using a computerized self-generated approach path;
    enable a pilot aid to help a pilot to avoid obstacles and select landing sites in unimproved areas during operating in low-light or low-visibility conditions;
    detect and maneuver around a man lift during flying;
    detect high-tension wires over a desert terrain; and
    enable operation in a near earth obstacle rich environment; and
  wherein the plurality of sensors include a navigation sensor configured to:
    map an unknown area where obstructions limit landing sites;
    identify level landing sites with approach paths that are accessible for evacuating a simulated casualty;
    build three-dimensional maps of a ground and find obstacles in a path;
    detect four-inch-high pallets, chain link fences, vegetation, people and objects that block a landing site;

enable continuously identifying potential landing sites and develop landing approaches and abort paths;

select a safe landing site being closest to a given set of coordinates;

wherein the navigation sensor includes an inertial sensor and a laser scanner, wherein the navigation sensor is paired with mapping and obstacle avoidance software, the mapping and obstacle avoidance software being operable to keep a running rank of the landing sites, the landing approaches and the abort paths to enable responding to unexpected circumstances.

15. The amphibious VTOL unmanned device of claim 14, wherein the mapping and obstacle avoidance software includes an open source code and an open source software development kit.

16. The amphibious VTOL unmanned device of claim 1, wherein the plurality of sensors are selected from a group comprising: individual sensors, stereo sensors, ultrasonic sensors, infrared sensors, multispectral sensors, optical flow sensors, and volatile organic compound sensors, wherein the plurality of sensors are provided for intelligent positioning, collision avoidance, media capturing, surveillance, and monitoring.

17. The amphibious VTOL unmanned device of claim 1, wherein the plurality of VTOL jet engines are adapted for VTOL, short takeoff and vertical landing (STOVL), conventional takeoff and landing (CTOL), and catapult assisted takeoff barrier arrested recovery (CATOBAR).

18. The amphibious VTOL unmanned device claim 1, wherein the plurality of VTOL jet engines include a tilt jet and a lift jet, the lift jet being a jet engine angled to provide aerostatic lift.

19. The amphibious VTOL unmanned device of claim 18, further comprising a stability system being controlled by a plurality of inputs including inputs of a pilot, and a plurality of actuating outputs, wherein one of the plurality of actuating outputs is to control an angular pitch of the tilt jet.

20. The amphibious VTOL unmanned device of claim 1, wherein the GSP system is configured to perform GSP thrust vector control by a vectoring nozzle.

21. The amphibious VTOL unmanned device of claim 20, wherein the GSP thrust vector control is used to control the direction of a thrust of the amphibious VTOL unmanned device, the GSP system controls an exhaust nozzle of the amphibious VTOL unmanned device to change a direction of the thrust relative to a center of gravity of the amphibious VTOL unmanned device.

22. The amphibious VTOL unmanned device of claim 21, wherein the GSP thrust vector control further comprises a bearing swivel module including a front bearing swivel module and a rear bearing swivel module, wherein the bearing swivel module controls the direction of the thrust, the bearing swivel module being configured to move the amphibious VTOL unmanned device by controlling the front bearing swivel module and the rear bearing swivel module.

23. The amphibious VTOL unmanned device of claim 22, wherein the bearing swivel module of the GSP thrust vector control includes one or more multi-bearing swivels.

24. The amphibious VTOL unmanned device of claim 1, wherein the plurality of parachutes include a drogue parachute.

25. The amphibious VTOL unmanned device of claim 1, further comprising a cockpit configured to display flight conditions on a display, a seat ejection system adapted for ejecting a seat of the amphibious VTOL unmanned device during emergency, and a collision avoiding system.

26. The amphibious VTOL unmanned device of claim 1, wherein the plurality of solar panels are fixed on a top of the plurality of foldable wings and the modular and expandable waterproof body, the plurality of solar panels being chrome plated, the plurality of solar panels providing power to the onboard electricity generator.

27. A system of controlling an amphibious vertical takeoff and landing (VTOL) unmanned device with an artificial intelligence (AI) data processing mobile and wearable the system of controlling the amphibious VTOL unmanned device comprising:

a processor configured to:

stabilize the amphibious VTOL unmanned device, wherein the stabilizing of the amphibious VTOL unmanned device is performed by at least one wing tail stabilizer and at least one horizontal stabilizer of the amphibious VTOL unmanned device by pitching at least one tilting jet engine of a plurality of VTOL jet engines of the amphibious VTOL unmanned device according to a required lift and using a plurality of lift fans of the amphibious VTOL unmanned device;

perform a tilting arrangement of the amphibious VTOL unmanned device, the tilting arrangement is adapted for tilting the at least one tilting jet engine of the plurality of VTOL jet engines of the amphibious VTOL unmanned device;

fold and unfold a plurality of foldable wings of the amphibious VTOL unmanned device;

vector a gimbaled swivel propulsion (GSP) thrust, wherein the vectoring is controlled by a thrust control mechanism;

wherein the vectoring of the GSP thrust is controlled by a plurality of bearing swivel modules, wherein the plurality of beating swivel modules control a thrust direction of the amphibious VTOL unmanned device, the plurality of bearing swivel modules are adapted to move the amphibious VTOL unmanned device by controlling a front bearing swivel module of the plurality of bearing swivel modules and by controlling a rear bearing swivel module of the plurality of bearing swivel modules;

wherein the vectoring of the GSP thrust is further controlled by a vectoring nozzle of the amphibious VTOL unmanned device, the vectoring nozzle is controlled by actuators associated with the amphibious VTOL unmanned device;

wherein the vectoring of the GSP thrust is further controlled by a gimbaled thrust system of the amphibious VTOL unmanned device, the gimbaled thrust system controls the vectoring nozzle of the amphibious VTOL unmanned device, the direction of the GSP thrust is changed relative to a center of gravity of the amphibious VTOL unmanned device;

charge batteries of the amphibious VTOL unmanned device via superchargers associated with the amphibious VTOL unmanned device, the batteries are adapted to supply power to an auxiliary power unit and a battery storage associated with the amphibious VTOL unmanned device.

28. The system of claim 27, wherein the processor is configured to control:

displaying the flight conditions on a touch screen of the amphibious VTOL unmanned device, recognizing a speech in a cockpit of the amphibious VTOL unmanned device, a seat ejecting system associated with the amphibious VTOL unmanned device and adapted for ejecting a seat of the amphibious VTOL unmanned device during emergency, and a collision avoiding system of the amphibious VTOL unmanned device;

capturing of flight conditions and environmental conditions by a plurality of cameras of the amphibious VTOL unmanned device, the plurality of cameras being adapted for surveillance;

opening of a parachute of the amphibious VTOL unmanned device for safe landing of the amphibious VTOL unmanned device during emergency landing and accidents.

29. The system of claim 27, wherein the amphibious VTOL unmanned device is made at least of aluminum and carbon fiber;

wherein the amphibious VTOL unmanned device comprises the plurality of VTOL jet engines, at least one two-way telemetry device, a broad cast device, a collision avoidance system, a processor, a navigation device, and a plurality of sensors, the plurality of VTOL jet engines including at least the at least one tilting jet engine.

* * * * *